(12) United States Patent
Wilson et al.

(10) Patent No.: US 9,509,135 B2
(45) Date of Patent: Nov. 29, 2016

(54) FAULT CURRENT LIMITER

(75) Inventors: Robert Wilson, Victoria (AU);
Mohinder Pannu, Victoria (AU)

(73) Assignee: GRIDON LTD., Givatayim (IL)

( * ) Notice: Subject to any disclaimer, the term of this patent is extended or adjusted under 35 U.S.C. 154(b) by 28 days.

(21) Appl. No.: 14/239,131

(22) PCT Filed: Aug. 17, 2012

(86) PCT No.: PCT/IB2012/054196
§ 371 (c)(1),
(2), (4) Date: May 23, 2014

(87) PCT Pub. No.: WO2013/024462
PCT Pub. Date: Feb. 21, 2013

(65) Prior Publication Data
US 2014/0254056 A1   Sep. 11, 2014

(30) Foreign Application Priority Data

Aug. 18, 2011  (GB) .................................. 1114277.5

(51) Int. Cl.
*H02H 7/00* (2006.01)
*H02H 9/02* (2006.01)
(Continued)

(52) U.S. Cl.
CPC ............. *H02H 9/021* (2013.01); *H01F 29/14* (2013.01); *H01F 38/023* (2013.01); *H01F 2003/103* (2013.01); *H01F 2006/001* (2013.01); *H02H 3/332* (2013.01)

(58) Field of Classification Search
USPC .................................................. 361/19, 93.9
See application file for complete search history.

(56) References Cited

U.S. PATENT DOCUMENTS 2,547,614 A  4/1951 Bedford
2,682,632 A  6/1954 Cohen et al.
(Continued)

FOREIGN PATENT DOCUMENTS

BE  6786575 A  9/1966
CN  1728495 A  2/2006
(Continued)

OTHER PUBLICATIONS

Extended European Search Report on related European Application No. 12823802.9 from European Patent Office (EPO) dated Feb. 3, 2015.
(Continued)

*Primary Examiner* — Danny Nguyen
(74) *Attorney, Agent, or Firm* — Klein, O'Neill & Singh, LLP

(57) ABSTRACT

A fault current limiter is provided that comprises a magnetically saturable core. The first core includes a first leg, a second leg, with a first AC coil wound on the second leg, a third leg, with a second AC coil wound around the third leg, the first and second AC coils being wound in series and connected to a first phase AC source, and a fourth leg. The first magnetic biasing unit is arranged to produce a first closed magnetic circuit in the first leg and the second leg that has a first flux direction, and the second coil is arranged to produce a second closed magnetic circuit in the fourth leg and the third leg that has a second flux direction, wherein the first flux direction opposes the second flux direction. The first and second AC coils are arranged to produce a first closed AC magnetic circuit in the second and third legs in an AC flux direction that alternates with each AC half-cycle.

20 Claims, 29 Drawing Sheets

(51) Int. Cl.
*H01F 29/14* (2006.01)
*H01F 38/02* (2006.01)
*H02H 3/33* (2006.01)
*H01F 3/10* (2006.01)
*H01F 6/00* (2006.01)

(56) References Cited

U.S. PATENT DOCUMENTS

| | | | |
|---|---|---|---|
| 3,219,918 A | 11/1965 | Trench | |
| 3,509,507 A * | 4/1970 | Specht | H01F 27/245 336/12 |
| 3,708,775 A | 1/1973 | Haddock et al. | |
| 4,045,823 A | 8/1977 | Parton | |
| 2005/0088790 A1 | 4/2005 | Shah et al. | |
| 2006/0044105 A1 | 3/2006 | Darmann et al. | |
| 2010/0254048 A1 | 10/2010 | Darmann | |
| 2011/0103106 A1 * | 5/2011 | Sato et al. | H02M 1/126 363/37 |

FOREIGN PATENT DOCUMENTS

| | | |
|---|---|---|
| CN | 2901528 Y | 5/2007 |
| CN | 201038749 Y | 3/2008 |
| CN | 101521374 A | 9/2009 |
| CN | 101577416 A | 11/2009 |
| EP | 0183015 A1 | 6/1986 |
| EP | 0984462 A2 | 3/2000 |
| EP | 1830446 A1 | 9/2007 |
| EP | 1841035 A2 | 10/2007 |
| FR | fr1472841 A | 5/1967 |
| GB | 1314270 A | 4/1973 |
| JP | 861109423 A | 5/1986 |
| JP | 2001-238349 A | 8/2001 |
| JP | 2005039965 A | 2/2005 |
| JP | 2006222387 A | 8/2006 |
| JP | 2011-510603 A | 3/2011 |
| WO | WO 2004068670 A1 | 8/2004 |
| WO | WO 2007/029224 A1 | 3/2007 |
| WO | WO 2009/055853 A1 | 5/2009 |
| WO | WO 2009/067746 A1 | 6/2009 |
| WO | WO 2009/121143 A1 | 10/2009 |
| WO | WO 2011024179 A2 | 3/2011 |

OTHER PUBLICATIONS

International Search Report on related United Kingdom Application No. GB1114277.5 from United Kingdom Intellectual Property Office (UKIPO) dated Nov. 15, 2011.

International Search Report on related PCT Application No. PCT/IB2012/054196 from International Searching Authority (ISA/IL) dated Dec. 2, 2012.

Office Action on related Japanese Application No. 2014-52556 from Japanese Patent Office dated Jul. 15, 2016.

* cited by examiner

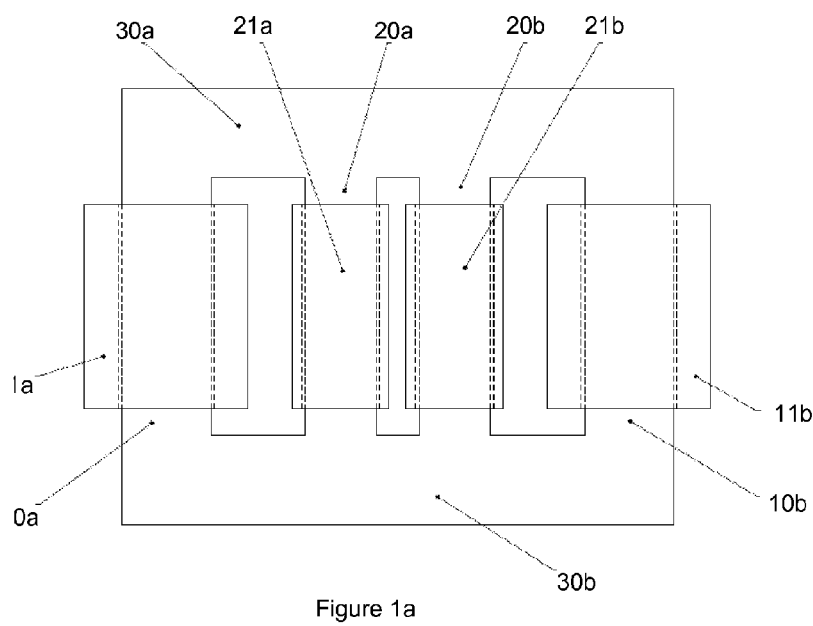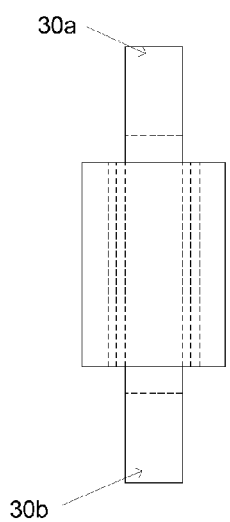
Figure 1a
Figure 1b

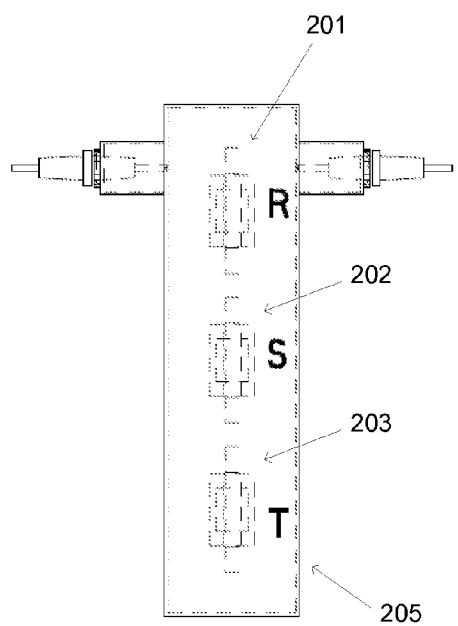
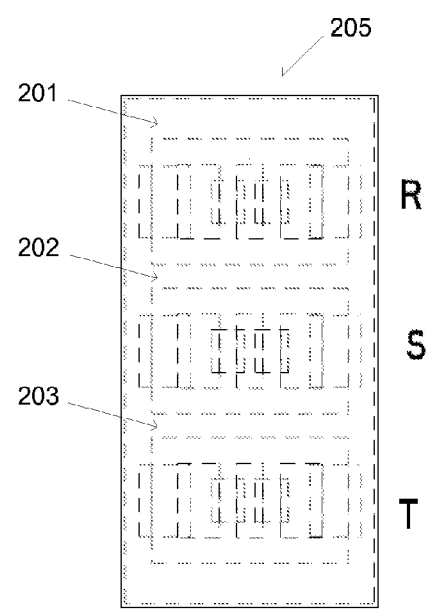
Figure 16a                     Figure 16b

FAULT CURRENT LIMITER

CROSS-REFERENCE TO RELATED APPLICATION

This application is a national phase filing, under 35 U.S.C. §371(c), of International Application No. PCT/IB2012/054196, filed Aug. 17, 2012, with claim of priority to United Kingdom Patent Application No. 1114277.5, filed in the United Kingdom Patent Office on Aug. 18, 2011, the disclosures of which are incorporated herein by reference in their entirety.

FIELD OF THE INVENTION

The present invention relates to a fault current limiter (FCL).

BACKGROUND OF THE INVENTION

Faults in electrical power systems cannot be avoided. Fault currents flowing from the sources to a location of the fault lead to high dynamical and thermal stresses being imposed on equipment e.g. overhead lines, cables, transformers and switch gears.

Conventional circuit breaker technology does not provide a full solution to selectively interrupting currents associated with such faults. The growth in electrical energy generation and consumption and the increased interconnection between networks leads to increasing levels of fault current. In particular, the continuous growth of electrical energy generation has the consequence that networks reach or even exceed the limits with respect to their short circuit withstand capability. Therefore, there is a need for devices that are capable of limiting fault currents.

Short circuit currents are rising as transmission and distribution networks expand to address increasing energy demand and connectivity of power generation and intermittent energy sources. These may result in power disruptions, equipment damage and major outages, which have been estimated to cost billions of dollars per year. In order to restrict fault current impact, utility operators have traditionally needed to resort to network segmentation and installation of expensive and lossy protection gear, such as series reactors, capacitors, high rated circuit breakers and high impedance transformers. Such solutions come at the cost of overall reduction of energy efficiency and network stability.

The use of fault current limiters (FCL) allows equipment to remain in service even if the prospective fault current exceeds it rated peak and short-time withstand current. Thus, replacement of equipment (including circuit breakers) can be avoided or postponed to a later time.

A fault current limiter (FCL) can be provided in various forms. One type of fault current limiter involves a fully magnetised (saturated) iron core. Such fault current limiters typically have one or more AC coils wound around an iron core, with the iron core being maintained in a saturated state by a DC bias coil in normal operating conditions. The AC coils are connected to the grid, and in normal conditions the coil is kept saturated, making the FCL virtually transparent to the grid during normal operation.

In a fault condition (e.g. a short-circuit), a current surge will increase the current on the AC coil, causing desaturation of the ion core. As a result of this desaturation of the ion core, the impedance will rise, acting to limit the current on the AC coil. Various arrangements of the saturable core and AC and DC coils are possible. An example of a prior art saturated core FCL is described in WO2007/029224.

BRIEF SUMMARY OF THE INVENTION

The present invention sets out to provide an FCL with improved performance compared to conventional arrangements.

According to a first aspect of the invention there is provided a fault current limiter comprising a first magnetically saturable core, the first core including: a first leg; a second leg, with a first AC coil wound on the second leg; a third leg, with a second AC coil wound around the third leg, the first and second AC coils being wound in series and connected to a first phase AC source; a fourth leg; wherein the first, second, third and fourth legs are arranged in order, wherein first ends of the first, second, third and fourth legs are joined by a first yoke and second ends of the first, second, third and fourth legs are joined by a second yoke; a first magnetic biasing unit arranged to produce a first closed magnetic circuit in the first leg and the second leg that has a first flux direction; and a second magnetic biasing unit arranged to produce a second closed magnetic circuit in the fourth leg and the third leg that has a second flux direction, wherein the first flux direction opposes the second flux direction; wherein the first and second AC coils are arranged to produce a first closed AC magnetic circuit in the second and third legs in an AC flux direction that alternates with each AC half-cycle.

The first magnetic biasing unit can comprise a first DC coil wound on the first leg, and the second magnetic biasing unit can comprises a second DC coil wound on the fourth leg. In such an arrangement, in one AC half-cycle the AC flux in the second leg opposes the DC flux in the second leg and the AC flux in the third leg supports the DC flux in the third leg, and in the next half cycle the AC flux in the third leg opposes the DC flux in the third leg and the AC flux in the second leg supports the DC flux in the second leg. Other embodiments can, however, use alternative arrangements for the first and second magnetic biasing units, with the same opposing/supporting effect of the AC flux on the first and second closed magnetic circuits produced by the first magnetic and second units.

In normal conditions, the second and third legs of the first core are saturated, and hence the impedance of the FCL is low. Hence, in normal conditions, the AC flux in the second and third legs is such that the second and third legs maintain deep saturation.

In fault conditions, the AC current will rise, such that in one half-cycle, the AC flux will be such that the second leg is brought out of saturation and the third leg is brought deeper into saturation. The effect of the second leg being brought out of saturation is to raise the impedance, which acts to limit the fault. In the next half cycle, the AC flux will be such that the third leg is brought out of saturation and the second leg is brought deeper into saturation, again acting to limit the fault.

Such embodiments are associated with improved fault to normal state impedance ratio, as a result of the closed AC magnetic circuit. This ensures that increase of impedance from normal to short circuit state is controlled by the core saturation alone instead of combined core-air magnetic path in some conventional arrangements. This provides a controlled increase of impedance in short circuit state, and high impedance ratios (typically well above 5) can be achieved without large increase of AC ampere turns.

In other words, having a closed AC magnetic path is beneficial from the point of view of achieving lower reluctance, with higher impedance than for conventional designs (that use, for example, a combined core-air magnetic path in an open circuit AC design). Furthermore, having a closed magnetic path for the DC magnetic circuits is also beneficial, as it reduces DC ampere-turns and reduces DC flux outside the FCL.

The first, second, third and fourth legs of the core may be orientated in the same direction. For example, the first, second, third and fourth legs may be arranged vertically. Arranging the legs vertically has the advantage that, from a manufacturing perspective, it is easier to assemble the core and coils when compared to conventional FCLs that use coils wound around horizontal legs. For example, horizontally laid DC coils in conventional FCLs have to be supported in air, and core laminations threaded through the coils, a few laminations at a time. This is slow and relatively unsafe during manufacturing.

In addition, in a FCL with horizontal coils that is arranged in a tank, the oil movement inside the horizontal ducts in the DC coils lacks hydraulic flow creating hot spot temperatures in the DC coils. This problem is avoided with vertical legs because hot oil (being lighter) rises to the top of the winding, setting up a thereto-syphon effect due to gravity. This oil head drives oil past the windings to reduce conductor temperature.

In other words, using vertically oriented windings provides a natural thermo-siphon effect and higher thermal head for oil flow through windings. Stagnant oil in horizontally oriented winding of conventional arrangements is prevented, winding temperature is reduced and hot spots are minimized.

The first and second yokes may be orientated in the same direction. For example, the first and second yokes are arranged horizontally.

The FCL may further comprise a third AC coil wound around the second leg and a fourth AC coil wound around the third leg, the third and fourth AC coils being wound in series and connected to a second phase AC source. The third and fourth AC coils may be arranged to produce a second closed AC magnetic circuit in the second and third legs in an AC flux direction that alternates with each AC half-cycle. Furthermore, the FCL may further comprise a fifth AC coil wound around the second leg and a sixth AC coil wound around the third leg, the fifth and sixth AC coils being wound in series and connected to a third phase AC source, wherein the fifth and sixth AC coils are arranged to produce a third closed AC magnetic circuit in the second and third legs in an AC flux direction that alternates with each AC half-cycle.

In such arrangements, the FCL can be for a three phase AC supply, with each AC phase connected to a pair or series connected AC coils. The first, third and fifth AC coils may be arranged in order on the second leg, and the second, fourth and sixth AC coils may be arranged in an opposite order on the third leg. In some embodiments, the AC coils for each phase AC source may be configured in pairs such that at least one of the pairs of AC coils exhibits unbalanced magnetic impedance relative to remaining ones of the pairs AC coils for each phase. In some embodiments, the AC coils of each phase can be wound with different numbers of turns so as to achieve asymmetrical magnetic impedance. In other embodiments, the AC coils of each phase can disposed on different portions of the inner legs so as to achieve asymmetrical magnetic impedance. Furthermore, the AC coils of each phase can have different coil geometries so as to achieve asymmetrical magnetic impedance.

In some embodiments, the second and third legs may have a smaller cross section than the first and fourth legs.

In some embodiments, the FCL may further comprise a tank arranged to house the first core, the tank being partially or completely filled with a dielectric fluid.

In some embodiments of small FCLs, dry type insulation may be used and the tank/enclosure may not contain a dielectric fluid.

In some embodiments, the FCL may further comprise a second magnetically saturable core, and a third magnetically saturable core, the second and third cores respectively including: a first leg; a second leg, with a first AC coil wound on the second leg; a third leg, with a second AC coil wound around the third leg, the first and second AC coils being wound in series; a fourth leg; wherein the first, second, third and fourth legs are arranged in order, wherein first ends of the first, second, third and fourth legs are joined by a first yoke and second ends of the first, second, third and fourth legs are joined by a second yoke; a first magnetic biasing unit arranged to produce a first closed magnetic circuit in the first leg and the second leg that has a first flux direction; and a second magnetic biasing unit arranged to produce a second closed magnetic circuit in the fourth leg and the third leg that has a second flux direction, wherein the first flux direction opposes the second flux direction; wherein the first and second AC coils are arranged to produce a first closed AC magnetic circuit in the second and third legs in an AC flux direction that alternates with each AC half-cycle. In such arrangements, the first and second AC coils of the second core may be connected to a second phase AC source, and the first and second AC coils of the third core may be connected to a third phase AC source. Hence, such arrangements can provide a three-phase FCL, with one four legged core for each of the three phases.

The second and third legs of the second and third cores may have a smaller cross-section than the first and fourth legs of the second and third cores.

The first, second and third cores may be arranged in a same tank, said tank being partially or fully filled with a dielectric fluid.

The first magnetic biasing unit of the second and third cores may respectively comprise a first DC coil wound on the respective first leg, and the second magnetic biasing unit of the second and third cores respectively comprises a second DC coil wound on the respectively fourth leg.

In some embodiments, a first common DC coil may be wound around the first, second and third cores to provide the first magnetic biasing units of the first, second and third cores, and a second common DC coil may be wound around the second legs of the first, second and third cores so as to provide the second magnetic biasing units of the first, second and third cores.

In some embodiments that employ three four legged cores, the first, second and third cores may be separate. The first, second and third cores may be arranged in vertically or horizontally in a same tank. Alternatively, the first, second and third cores are arranged in separate tanks. The tank(s) may be partially or fully filled with a dielectric fluid.

BRIEF DESCRIPTION OF THE FIGURES

Embodiments of the invention will now be described, by way of example and with reference to the accompanying drawings in which:—

FIGS. 1a and 1b show an FCL according to a first embodiment of the invention;

FIG. 12a-15a show models of flux density (B) and FIG. 12b-15b show models of AmpTurns/m (H) for various times during a fault condition of the second embodiment of the invention;

FIGS. 16a and 16b show cross-sections of an FCL according to a third embodiment of the invention;

DETAILED DESCRIPTION

Figure 2:
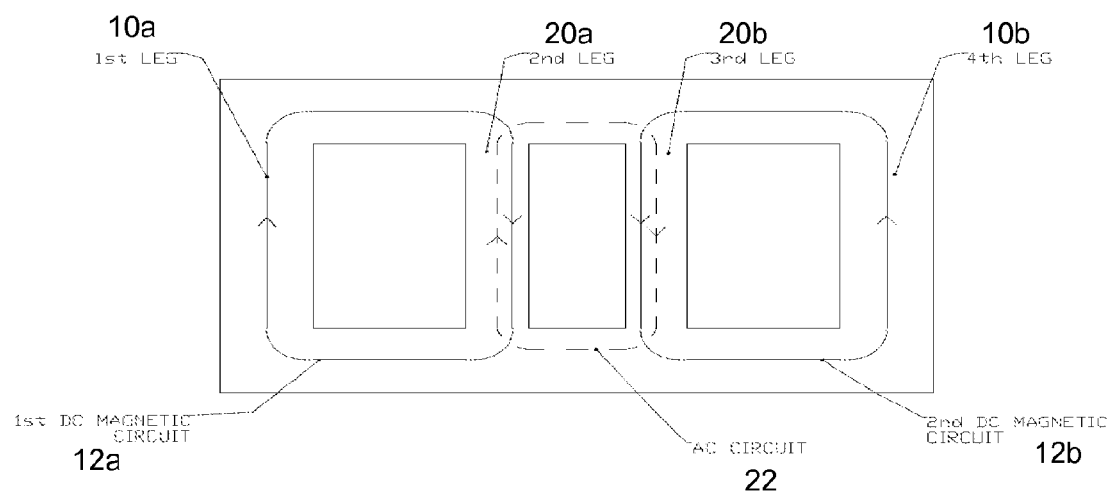
FIG. 2 shows a schematic illustration of the magnetic circuits produced in FCL according to the first embodiment of the invention.

FIGS. 1a and 1b show a first embodiment of the invention. In this embodiment, the FCL 1 has a single core, and the FCL 1 is arranged to limit fault currents for a single phase AC supply. FIG. 1a shows a side view, whereas FIG. 1b shows an end view.

As shown in FIG. 1a, the FCL 1 has a single core that includes four legs 10a, 20a, 20b and 10b aligned in the same direction. The four legs are joined by a first yoke 30a at one end, and by a second yoke 30b at the other end. In this embodiment, the four legs 10a, 20a, 20b and 10b are aligned vertically, with the two yokes 30a, 30b aligned horizontally.

A first DC coil 11a is wound around the first leg 10a, and a second DC coil 11b is wound around the fourth leg 10b. Hence, a DC coil is wound around each of the two outer legs 10a and 10b.

A first AC coil 21a is wound around the second leg 20a, and a second AC coil 21b is wound around the third leg 20b. The AC coils 21a and 21b are connected in series, and are connected to the grid. Hence, the two AC coils 21a and 21b are wound around in series around the inner legs.

The DC coils 11a and 11b are wound so that the flux produced by the DC coils in the outer two legs has opposing polarity. The AC coils are wound such that the flux produced by the AC coils in the inner two legs supports the DC flux in one AC leg and opposes the DC flux in the other AC leg.

Hence, the arrangement of FIG. 1 has a closed magnetic loop for the DC flux and a closed magnetic loop for the AC flux. This is shown FIG. 2, which schematically shows the magnetic circuits produced by the DC and AC coils. The coils themselves are not shown in FIG. 2, for ease of illustration.

As shown in FIG. 2, the first DC coil 11a produces a first DC magnetic circuit 12a in a closed group around the first leg 10a and the second leg 20a. The second DC coil produces a second DC magnetic circuit 12b in a closed loop around the fourth leg 10b and the third leg 20b. As shown in FIG. 2, the first DC magnetic circuit 12a has a first DC flux direction (clockwise in FIG. 2) and the second DC magnetic circuit 12b has a second DC flux direction (anti-clockwise in FIG. 2).

The AC coils 21a and 21b are wound such that the there is a closed AC magnetic circuit 22. The direction of the closed AC magnetic circuit 22 is such that the AC flux in one of the inner legs will oppose the DC flux in that leg, whereas the AC flux in the other leg will support the DC flux in that leg. The situation will reverse in the next half-cycle of the AC current.

Hence, FIG. 2 shows a snapshot in time the AC flux in the second leg 20a opposes the DC flux in the second leg 20a, whereas the AC flux in the third leg 20b supports the DC flux in the third leg 20b. In the next half-cycle, the direction of the AC magnetic circuit will reverse (i.e. it will switch from being clockwise to anticlockwise), and the AC flux in the second leg 20a will support the DC flux in the second leg 20a, and the AC flux in the third leg 20b will oppose the DC flux in the third leg 20b.

The legs and yokes have, in this embodiment, interleaved, mitred, step-lapped joints. However, other embodiments can employ simpler arrangements, using non-mitred, butt-lapped joints. The core is built from grain-oriented sheet steel laminations, though other embodiments could use alternative core structures.

The coils (AC and DC) are made of electrolytic grade copper in this embodiment. However, other embodiments could use alternative materials for the coils.

The FCL 1 of the first embodiment can further comprise a tank (not shown) arranged to house the core. The tank can be partially or completely filled with a dielectric fluid. Any suitable dielectric fluid could be used, for example mineral oil or vegetable oil (which have been found to be suitable as a dielectric for voltages up to 300 kV and beyond).

In the embodiment of FIG. 1a, which represents a FCL rated 10 kVA, the outer DC legs (first leg 10a and fourth leg 1b), top yoke 30a and bottom yoke 30b are each 60 mm wide and 32 mm deep. The inner AC legs (second leg 20a and third leg 20b) are each 40 mm wide and 32 mm deep. The leg centres are 103 mm between the AC legs and 149 mm between the AC and DC legs. As will be explained in more detail, the longer distance between AC and DC legs reduces the AC voltage induced in DC coils during short circuit.

In the illustrated embodiment, each DC coil 11a, 11 b has 60 turns and 50 Arms normal current, and each AC coil 20a, 20b has 48 turns and 14.5 Arms normal current. It will be, of course, appreciated that the example values and dimensions of the FCL mentioned above are purely for illustrative purposes. FCLs according to the present invention may, for example, have much higher current ratings and may be much larger in size.

The operation of the fault current limiter 1 shown in FIG. 1a in normal and fault conditions will now be explained. The single phase configuration was simulated as a 3D Transient Electromagnetic model, and the results are shown in FIGS.

Figure 3:
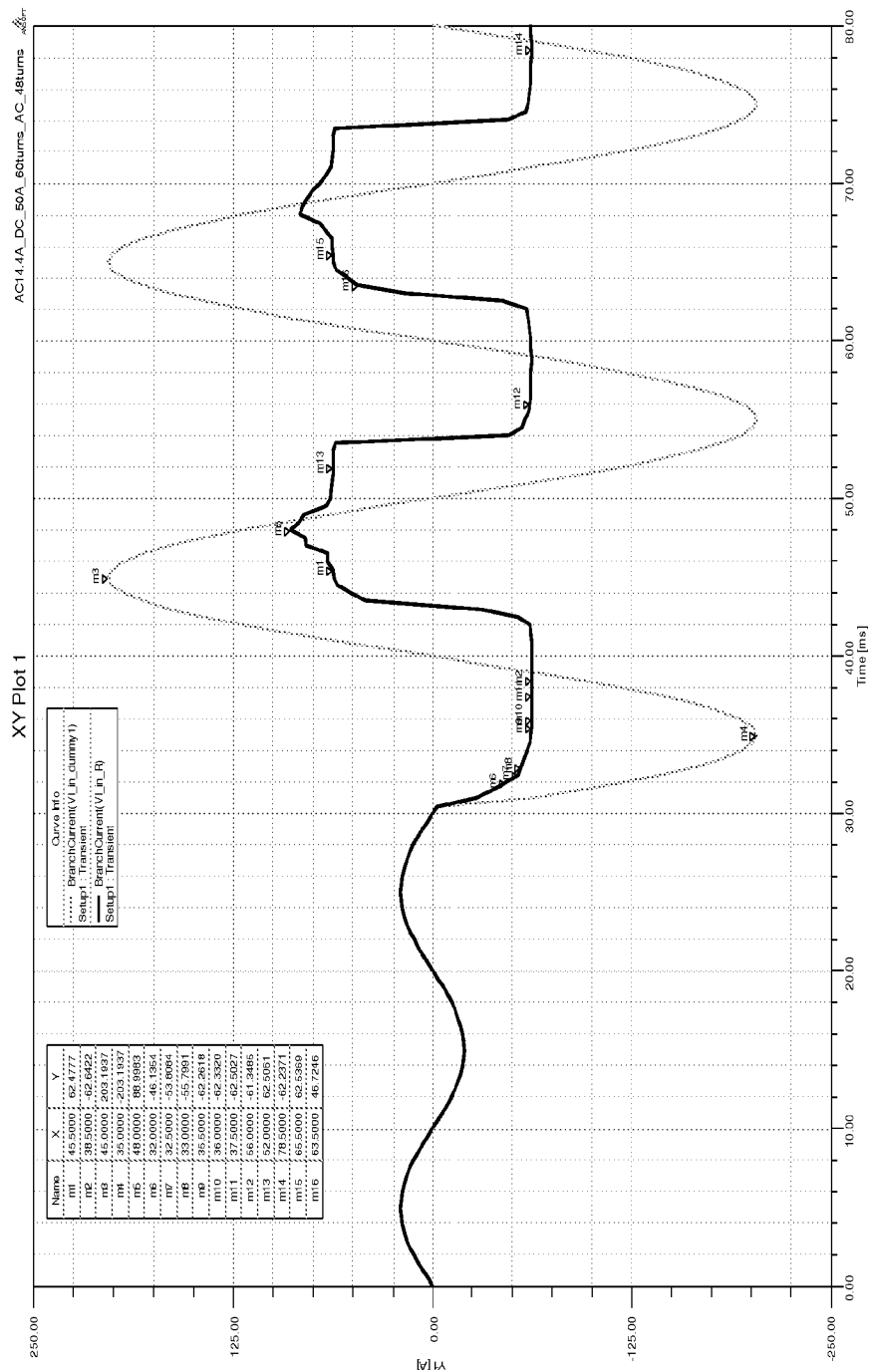
FIG. 3 is a graph of AC current on the against time for the first embodiment of the invention.

3-6, which will be used to explain the operation of the fault current limiter 1 shown in FIG. 1a in normal and fault conditions FIG. 3 shows a graph of current versus time for the series connected AC coils 21a and 21b shown in FIG. 1a. The darker line shows the current with the FCL 1 in operation, and the lighter line shows the perspective short circuit current of the system if the FCL 1 were not in the circuit. In this example, the prospective short circuit current is simulated as 143.5 Arms.

Up to a time of 30.5 milliseconds, the FCL 1 is under normal conditions. Hence the AC current up to a time of 30.5 milliseconds is sinusoidal. The lighter line shows the AC current that would flow if the FCL 1 were not in the circuit in the event of a short circuit. The darker line shows the limited short circuit current resulting from the fault current limitation of the FCL 1.

Figure 4A:
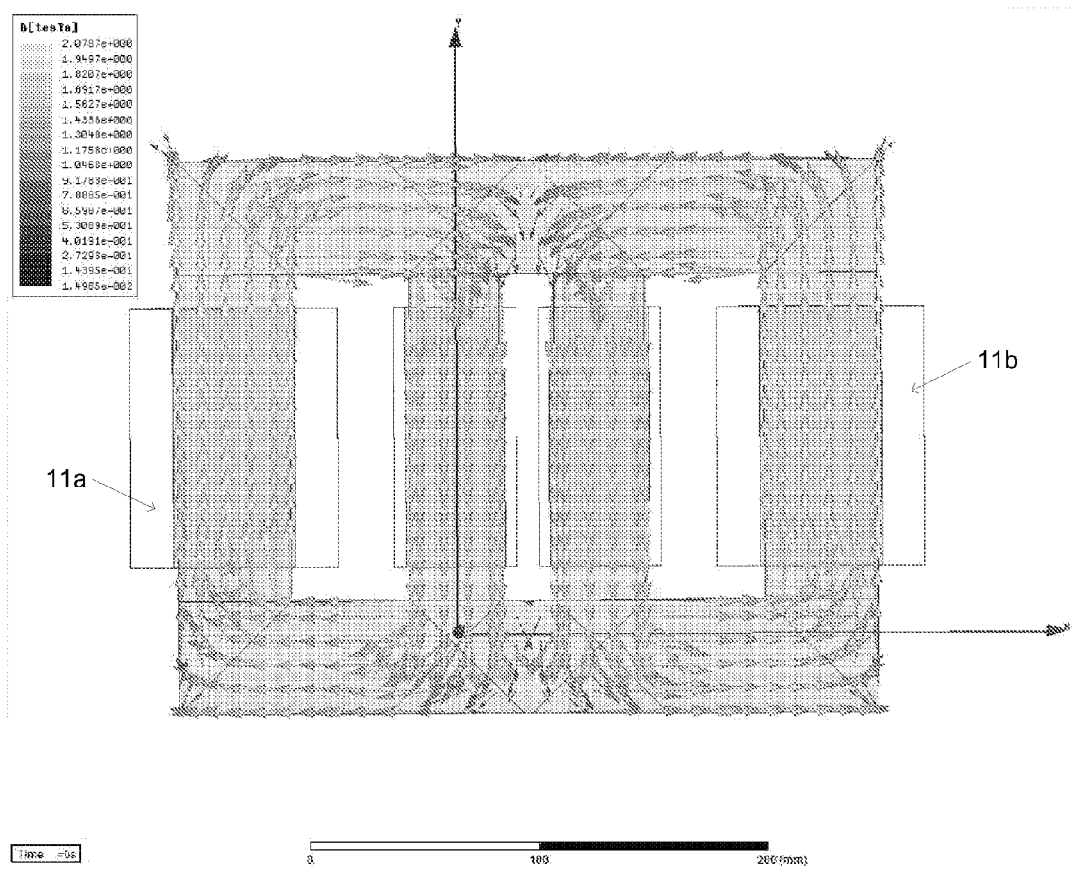
FIG. 4a shows a model of flux density (B) and FIG. 4b shows a model of AmpTurns/m (H) for the initial state of the first embodiment of the invention.
Figure 4B:
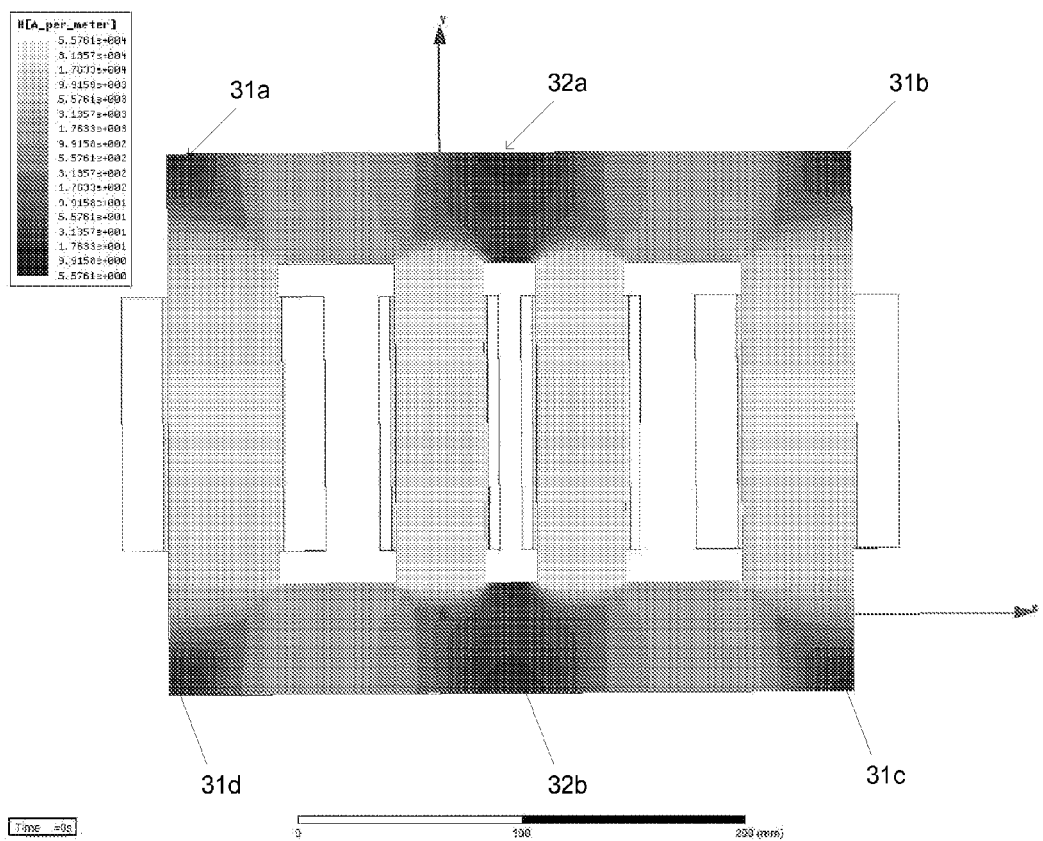

FIG. 4a shows a model of flux density (B) and FIG. 4b shows a model of AmpTurns/m (H) for the initial state (t=0 milliseconds) of the first embodiment of the invention.

The initial (transient) state (t=0 milliseconds) is used to set up the transient analysis. At this point, the AC current is 0 A, and the DC current in each DC coil is 50 A. As shown in the flux plot of FIG. 4a, the flux produced by each DC coil 11a, 11b returns through the nearest AC leg.

Hence, the first DC coil 11a produces a first DC magnetic circuit 12a that flows around the first leg 10a and the second leg 20a. The second DC coil 11b produces a second DC magnetic circuit 12b that flows around the fourth leg 10b and the third leg 20b. The first DC magnetic circuit 12a flows in a different direction to the second DC magnetic circuit 12b. There is no current on the AC coils, and hence there is no flux produced by the AC coils.

Hence, in the illustrated embodiment, the first DC magnetic circuit 12a flows in a clockwise direction and the second DC magnetic circuit 12b flows in an anti-clockwise direction.

As a result of this arrangement of the flux, as shown in the saturation plot 4b, each of the first 11a, second 20a, third 20b and fourth 10b legs are in saturation (light colour in FIG. 4b. As shown in FIG. 4b, the AC legs 20a and 20b are deeper in saturation (lighter in colour) than the DC legs as they have a smaller cross-section in this embodiment.

As shown in FIG. 4b, the four legged arrangement of the FCL 1 is such to keep the first 10a, second 20a, third 20b and fourth 10b legs in saturation, while having areas of the yokes 30a and 30b out of saturation. As shown in FIG. 4b, the corner regions of the yokes 31a, 31b, 31c and 31d are out of saturation, as are the regions 32a and 32b between the two inner legs (second leg 20a and third leg 20b).

Hence, as shown in FIG. 4b, each DC coil couples to its nearest AC coil, with the flux concentrated on the four legs, with maximum saturation on the two inner legs.

Figure 5A:
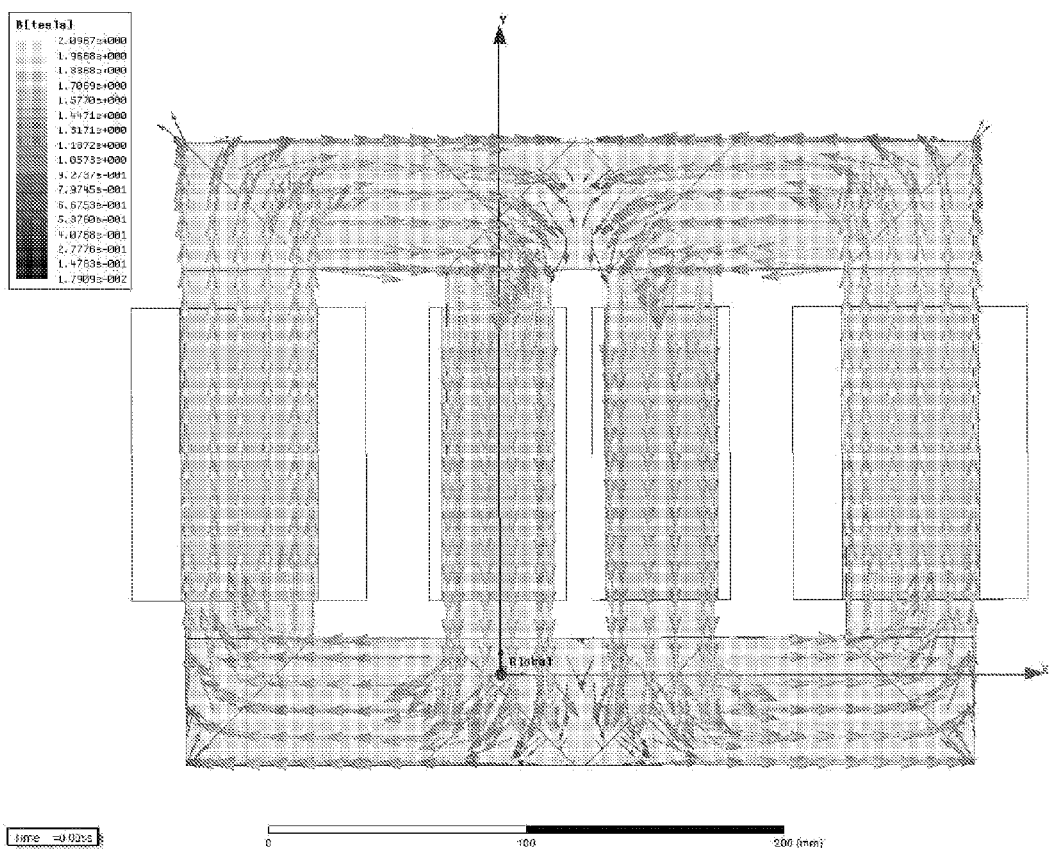
FIG. 5a shows a model of flux density (B) and FIG. 5b shows a model of AmpTurns/m (H) for normal operating conditions of the first embodiment of the invention.
Figure 5B:
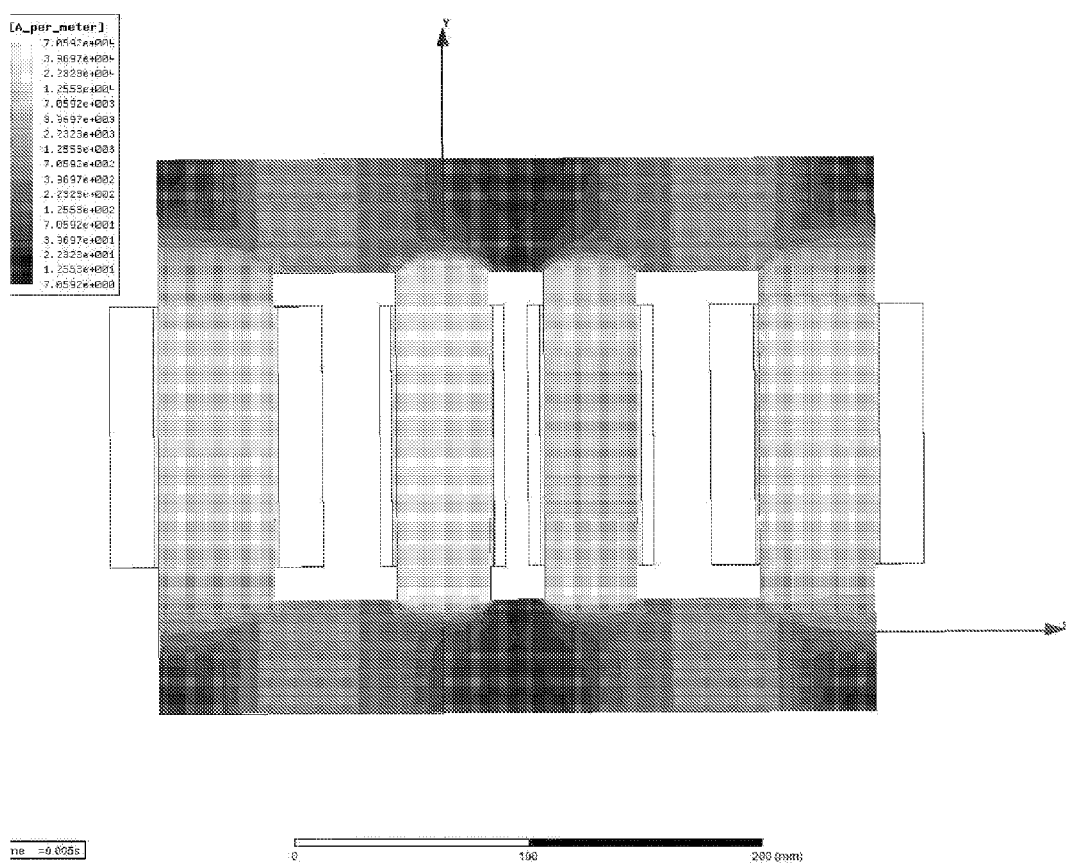

FIGS. 5A and 5B show flux density (B) and AmpTurns/m (H) plots at a snapshot in time in the normal current state (t=5 milliseconds). As shown in FIG. 3, a time of 5 milliseconds shows peak AC current in the normal current state.

FIG. 5A shows the net magnetic flux in the FCL 1 (i.e. adding the flux contributions of the AC and DC magnetic circuits). At the AC current peak occurring at time of 5 milliseconds, the flux produced by the AC coils 21a and 21b closed AC magnetic circuit 22 is anticlockwise in this half cycle. Hence, the flux produced by the AC coil 21a in the second leg 20a supports the DC flux produced by the first DC coil 11a in the second leg 20a, whereas the AC flux produced by the second AC coil 21b in the third leg 20b opposes the DC flux produced by the second DC magnetic circuit 12b in the third leg 20b.

As a result, as shown in FIG. 5b, the second leg 20a is put deeper in saturation (lighter in colour) when compared to the equivalent plot of the second leg 20a in FIG. 4B under transient conditions, whereas the third leg 20b is made less saturated (darker in colour) when compared to the third leg 20b in FIG. 4B.

This arrangement of the AC magnetic circuit supporting/opposing the DC magnetic circuits will reverse in the next half cycle, with the third leg 20b becoming more saturated and the second leg 20a becoming less saturated than under the transient conditions.

Under normal conditions, the second and third legs are kept in a saturated state (with one leg being more saturated than the other leg). Hence, under normal conditions, the saturated coils of legs 20a and 20b have very low impedance, and hence the FCL 1 is virtually transparent to the grid connected to the FCL 1.

In the above described embodiment, the AC legs have a smaller cross-section than the DC legs. This has the advantage that the AC legs are easier to saturate than the DC legs, which helps ensure low impedance in normal conditions.

Figure 6A:
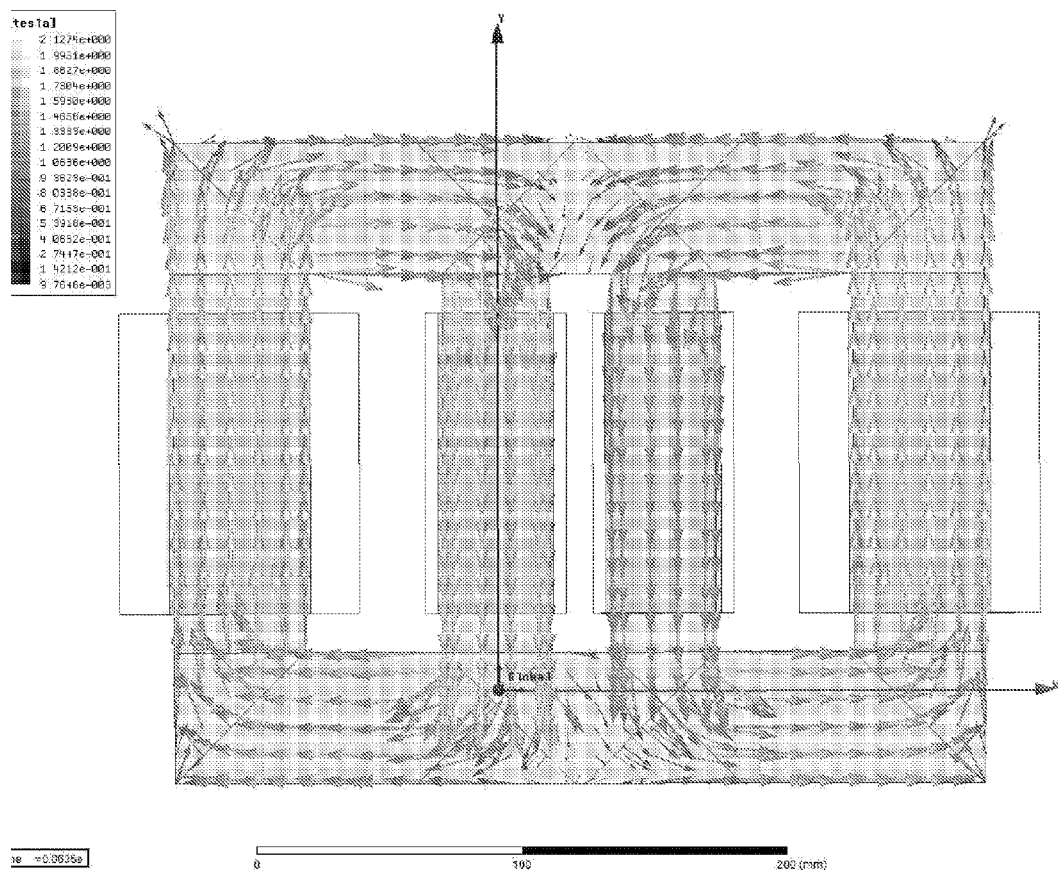
FIG. 6a shows a model of flux density (B) and FIG. 6b shows a model of AmpTurns/m (H) for fault conditions of the first embodiment of the invention.
Figure 6B:
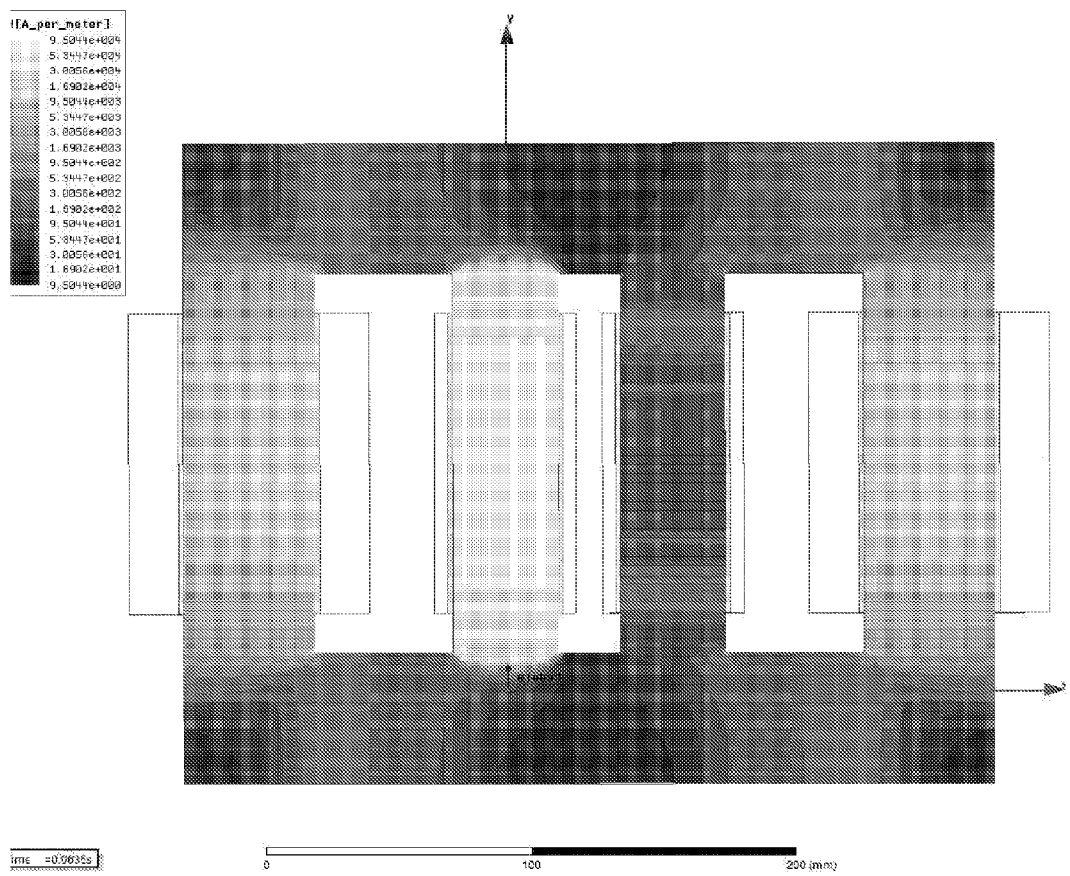

As shown in FIG. 3, at a time of 30.5 milliseconds, a short circuit state is simulated. FIGS. 6A and 6B show flux and saturation plots at a snapshot in time in this short circuit state (t=63.5 milliseconds). A time of 63.5 milliseconds represents a region near the fourth AC current peak after the short circuit.

The arrangement of the DC and AC magnetic circuits in FIGS. 6a and 6b are the same as those described in the normal current state in FIGS. 5a and 5b, except the magnitude of the AC flux is increased due to the higher AC current in the short circuit state. Hence, in the short circuit state, the effect of the AC magnetic circuit supporting the DC flux in one leg and opposing the DC flux in the other inner leg is magnified.

As shown in FIG. 6B, the magnification of the AC magnetic circuit supporting/opposing the DC magnetic circuits has the effect of (in this half cycle) putting the second leg 20a into very high saturation, whilst putting the third leg 20b into an unsaturated state. The effect of the third leg 20b being in the unsaturated state in FIG. 6B will be that the impedance of the right-hand leg will increase, acting to limit the fault current.

The situation in the next AC half cycle will reverse, with the second leg 20a being put out of saturation (and hence its impedance will rise), with the third leg 20b being more saturated. Hence, during fault conditions, in every half-cycle, one of the second or third legs (i.e. the inner legs) will be out of saturation, ensuring a high impedance state.

This alternation of raising impedance in the one of the inner legs continues until the fault is cleared.

Table 1 shows computed AC impedance for the normal state and for five half cycles after the simulated short circuit.

TABLE 1

| t, msec | Irms, A | Urms, V | Xrms, Ohm | Ratio SC/Normal Impedance |
|---|---|---|---|---|
| 30 | 14.21 | 1.296 | 0.091 | |
| 40 | 39.96 | 21.49 | 0.538 | 5.9 |
| 50 | 46.42 | 46.94 | 1.011 | 11.1 |
| 60 | 43.12 | 48.97 | 1.356 | 12.5 |
| 70 | 45.05 | 38.4 | 0.853 | 9.4 |
| 80 | 43.46 | 49.73 | 1.144 | 12.6 |

As can be seen from Table 1, the ratio of the short circuit to normal impedance varies from 5.9 to 12.6 for the five successive half cycles after short circuit.

The FCL 1 of the first embodiment is associated with a number of advantages. The exemplified 10 kVA four legged design offers high impedance under short circuit. The simulated design can have reduced AC and DC ampere turns and reduced mass compared to conventional arrangements, and yet achieve performance of a short circuit to normal impedance ratio of greater than 5.

The all-core magnetic path in the closed-AC design offers low reluctance, with high impedance than for conventional designs (that use, for example, a combined air/core magnetic path in an open circuit AC design). Hence, the ratio of short circuit to normal impedance is higher than for conventional FCLs.

Furthermore, embodiments of the invention are associated with manufacturing advantages. In the embodiment of FIG. 1, the four legs are arranged vertically, and hence all the coils (DC and AC) are wound around vertical legs. Coils wound around vertical legs are preferred to coils wound around horizontal legs for a number of reasons. One reason is performance when arranged in a tank comprising a dielectric such as oil. In coils wound around vertical legs, hot oil (being lighter) rises to the top of the winding, setting up a thermosyphon effect due to gravity. This oil head drives oil through the windings to reduce conductor temperature. In horizontal arrangements, oil cannot travel vertically, and will be stagnant and create higher temperature in the windings. To compensate, larger section conductor is needed or more cooling ducts provided to cool the windings at extra cost.

Vertically oriented DC and AC coils provide good control over conductor temperature through efficient oil movement.

In addition, during manufacture of embodiments of the invention that use vertically arranged legs, the bottom yoke and legs can first built in on a horizontal table. This assembly can then be up-ended and the two DC and two AC coils can be lowered on the legs. The top yoke can then be inserted to join the legs. This is a safe and relatively fast building process. By contrast, horizontal windings cannot be lowered on to legs. They have to be hung/supported in the air whilst core laminations are inserted through the inside of the windings. This slows the manufacturing process. Also, if the horizontal coil is to be placed in the top yoke, the coil support while inserting the laminations poses a safety hazard for people working below the coil.

Furthermore, it is possible to rigidly support all windings from the tank bottom via core feet-bottom frame-bottom blocks. Core-coil assembly is well supported during shipping and is more stable under short circuit forces. The horizontally slung DC coils in conventional arrangements (besides being a safety hazard during Core-coil assembly) are not well supported during assembly, operation and short circuit.

As discussed, having a closed AC arrangement is beneficial from the point of view of achieving lower reluctance, with higher impedance than for conventional designs (that use, for example, a combined air/core magnetic path in an open circuit AC design). Furthermore, having a closed magnetic path for the DC is also beneficial, as it reduces the DC flux outside the FCL.

Having two DC bias coils enables some embodiments of the invention to be configured so that the parameters of the DC supply may be chosen such that in case of a failure of one DC supply, the second DC supply may provide acceptable parameters of the FCL. Thus a high reliability of the FCL can be achieved.

The DC coils provide a controllable level of saturation of the ferromagnetic core and are mounted in parallel to the AC flux direction on a core segment where the net AC flux across the DC coil is minimal. In accordance with some embodiments, improved saturation of the AC limbs of the saturated ferromagnetic core of the FCL can be achieved by using as DC limbs of the core with larger cross-section and/or larger saturation induction. By such means, a lower quantity of the incremental permeability in the AC limbs may be achieved with fewer ampere-turns of the DC coils.

In the above described embodiment, first DC coil wound on the first leg and a second DC coil wound on the fourth leg, each producing a closed magnetic circuit in the manner described. The first DC coil is therefore an example of a first magnetic biasing unit arranged to produce a first closed DC magnetic circuit in the first leg and the second leg that has a first flux direction, and the second DC coil is an example of a second magnetic biasing unit arranged to produce a second closed magnetic circuit in the fourth leg and the third leg that has a second flux direction opposite to the first flux direction. Hence, in this embodiment, the first magnetic biasing unit comprises a first DC coil wound on the first leg, and the second magnetic biasing unit comprises a second DC coil wound on the fourth leg.

In other embodiments, the first magnetic biasing unit (arranged to produce a first closed DC magnetic circuit in the first leg and the second leg that has a first flux direction), and second magnetic biasing unit (arranged to produce a second closed magnetic circuit in the fourth leg and the third leg that has a second flux direction opposite to the first flux direction) can take other forms. For example, the first magnetic biasing unit could take the form of one or more permanent magnets that form all or part of the first leg. Similarly, the second magnetic biasing unit could take the form of one or more permanent magnets that form all or part of the fourth leg. Alternately, the first and/or second magnetic biasing unit could comprise another magnetic source, such as one derived from a high temperature superconductor source.

In other words, while the above described embodiment discusses the use of first and second DC coils as the first and second magnetic biasing units, embodiments of the invention are not limited in this way.

Figure 7A:
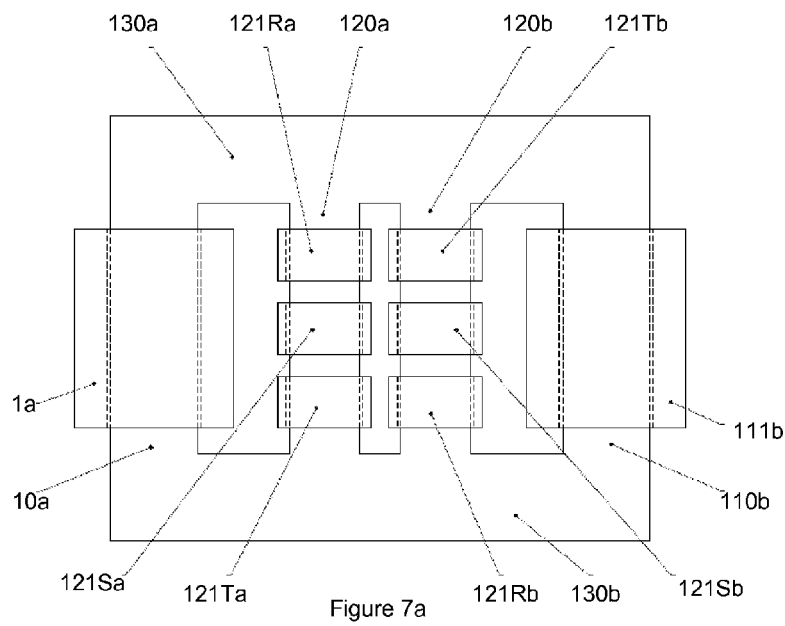
FIGS. 7a and 7b show an FCL according to a second embodiment of the invention.
Figure 7B:
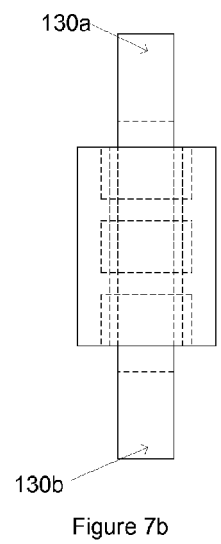

FIGS. 7*a* and 7*b* show another embodiment of the invention. In this embodiment, the FCL 100 has a single core, and the FCL is arranged to limit fault currents for each phase of a three-phase AC supply. FIG. 7*a* shows a side view, whereas FIG. 7*b* shows an end view.

In the embodiment shown in FIG. 7*a*, there is a single core with four legs 110*a*, 120*a*, 120*b* and 110*b* aligned in the same direction, with a first yoke 130*a* joining one end of the four legs, and a second yoke 130*b* joining the other ends of the four legs. In this embodiment, the four legs 110*a*, 120*a*, 120*b* and 110*b* are aligned vertically, with the two yokes 130*a*, 130*b* aligned horizontally.

A DC coil 111*a* is wound around the first leg 110*a*, and a second DC coil 111*b* is wound around the fourth leg 110*b* (i.e. around the two outer legs). There are two AC coils connected in series for each of the three phases of the AC supply.

As shown in FIG. 7*a*, a first AC coil 121Ra and a second AC coil 121Rb are connected in series to the first (R) phase of the three-phase supply. The first AC coil 121Ra is wound around the second leg 120*a*, and the second AC coil 121Rb is wound around the third leg 120*b*.

A third AC coil 121Sa is connected in series to a fourth AC coil 121Sb, and the third and fourth AC coils 121Sa and 121Sb are connected to the second (S) phase of the three-phase supply. The third AC coil 121Sa is wound around the second leg 120a, and the fourth AC coil 121Sb is wound around the third leg 120b.

A fifth AC coil 121Ta is connected in series to a sixth AC coil 121Tb, and the fifth and sixth AC coils 121Ta and 121Tb are connected to the third (T) phase of the three-phase supply. The fifth AC coil 121Ta is wound around the second leg 120a, and the sixth AC coil 121Tb is wound around the third leg 120b.

The AC coils on second leg 120a are placed top to bottom as first 121Ra, third 121Sa and fifth 121Ta respectively. In other words, the first 121Ra, third 121Sa and fifth 121Ta AC coils are arranged in order on the second leg 120a.

The AC coils on third leg 120b are placed top to bottom as sixth 121Tb, fourth 121Sb and second 121Rb respectively. In other words, the AC coils on the third 120b leg are arranged in an opposite order of the R, S, T phases when compared to the second leg 120a. Other sequential arrangements of R, S and T phases may be used on the AC legs in other embodiments.

The AC coils for each of the three phases are wound in a similar way to the AC coils 21a and 21b in FIG. 1a. In other words, they are wound so as to each produce an AC magnetic circuit within the two inner limbs (second leg 120a and third leg 120b) that opposes the DC flux in one leg and supports the DC flux in the other leg, with the situation reversing in the next half cycle.

The legs and yokes have, in this embodiment, interleaved, mitred, step-lapped joints, like the first embodiment. However, other embodiments may employ different arrangements. The core is built from grain-oriented sheet steel laminations, though other embodiments could use alternative core structures.

The coils (AC and DC) are made of electrolytic grade copper in this embodiment. However, other embodiments could use alternative materials for the coils, e.g. aluminium. Furthermore, in some embodiments the AC and DC coils can be wound on circular, oval or rectangular formers.

The operation of the fault current limiter 100 shown in FIG. 7 in normal and fault conditions will now be explained. As for the first embodiment, the second embodiment was simulated as a 3D Transient Electromagnetic model, and the results are shown in FIGS. 9-15, which will be used to explain the operation of the fault current limiter 100 shown in FIG. 7a in normal and fault conditions.

Figure 8:
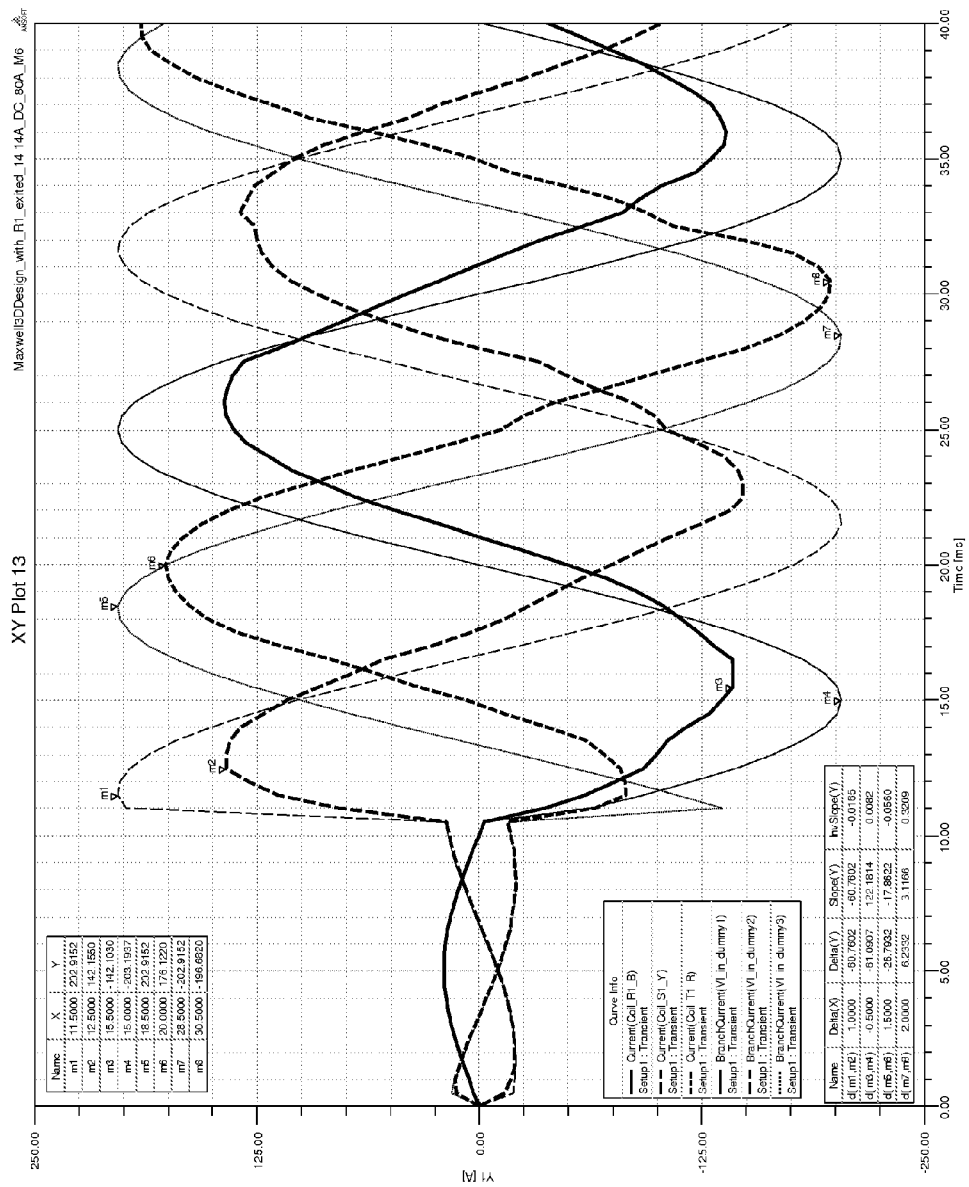
FIG. 8 is a graph of AC current on the against time for the second embodiment of the invention.

FIG. 8 shows a plot of current against time for the three-phase arrangement shown in FIG. 7a. As shown in FIG. 8, a short circuit occurs at around 10.5 milliseconds. The darker lines show the current with the FCL 100 in operation, and the lighter lines show the perspective short circuit currents of the system if the FCL 100 were not in the circuit. In this example, the prospective short circuit currents is simulated as 143.5 Arms.

Figure 9A:
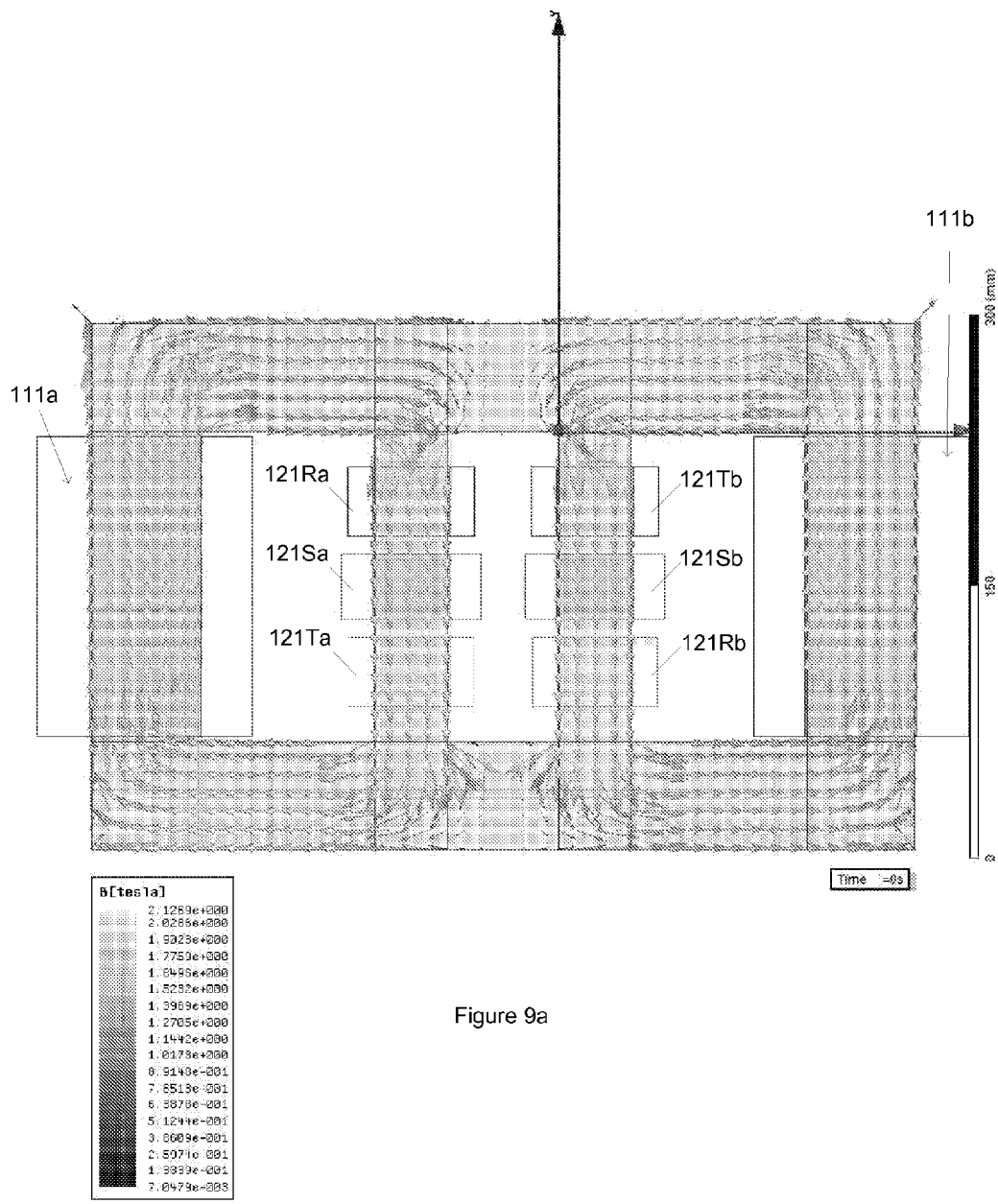
FIG. 9a shows a model of flux density (B) and FIG. 9b shows a model of AmpTurns/m (H) for the initial state of the second embodiment of the invention.
Figure 9B:
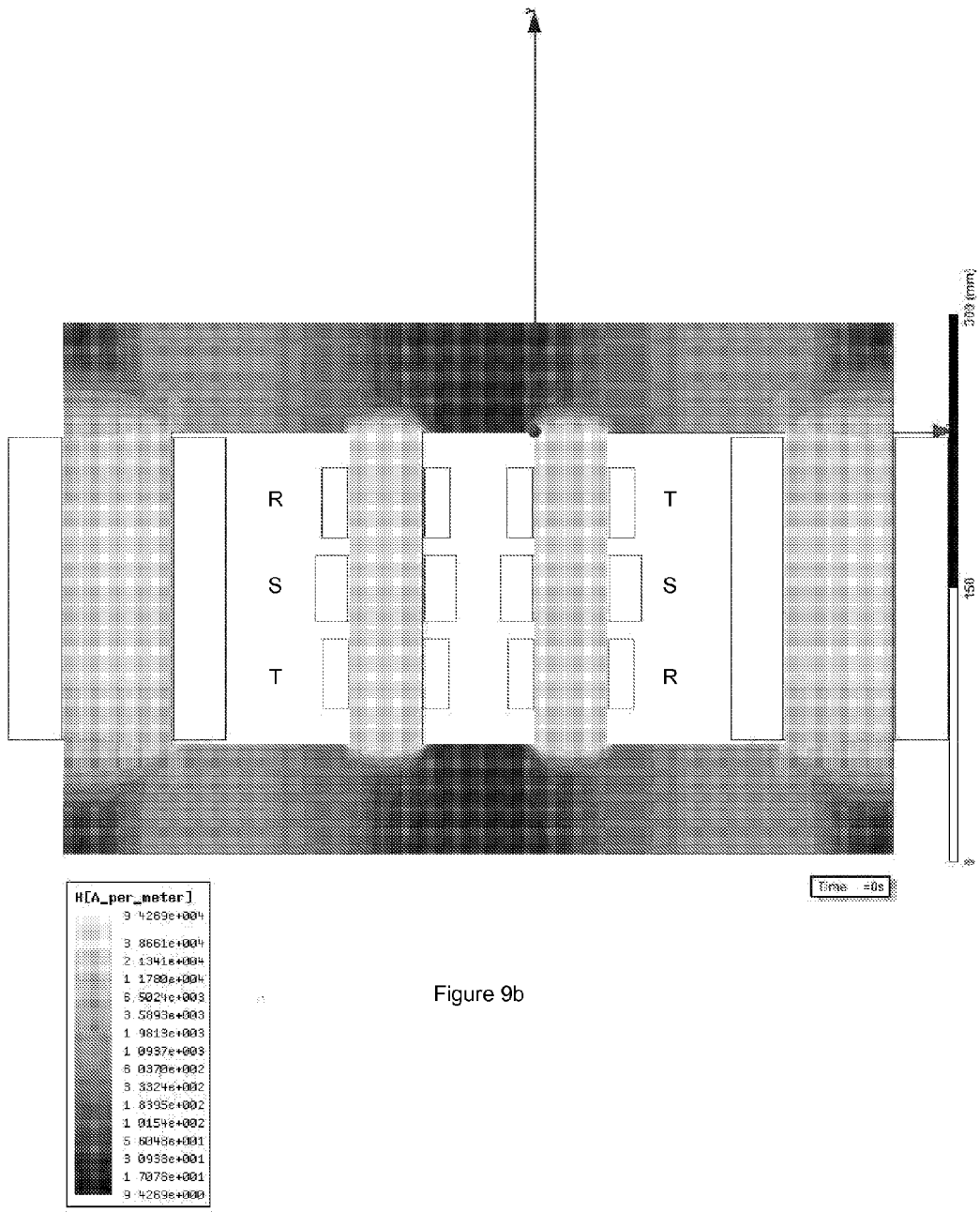

FIGS. 9a and 9b show an initial state, at a time of t=0 milliseconds, at which point the AC current is 0 A, and the DC current in each DC coil is 50 A. As can be seen from FIG. 9a, the first and second DC coils 111a and 111b produce first and second closed magnetic circuits such that one DC magnetic circuit is clockwise, and the other DC magnetic circuit is anticlockwise.

The flux produced by each DC coil 111a, 111b returns through the nearest AC leg. There is no current on the AC coils, and hence there is no flux produced by the AC coils.

As shown in FIG. 9b, the effect of the DC flux is to put each of the four legs into saturation, with a similar pattern of unsaturated areas in the corners and sections between the two inner legs as is described in relation to FIG. 4b. As shown in FIG. 9b, the AC legs 120a and 120b are deeper in saturation (lighter in colour) than the DC legs as they have a smaller cross-section in this embodiment.

Hence, as shown in FIG. 9b, each DC coil couples to its nearest AC coil, with the flux concentrated on the four legs, with maximum saturation on the two inner legs.

Figure 10A:
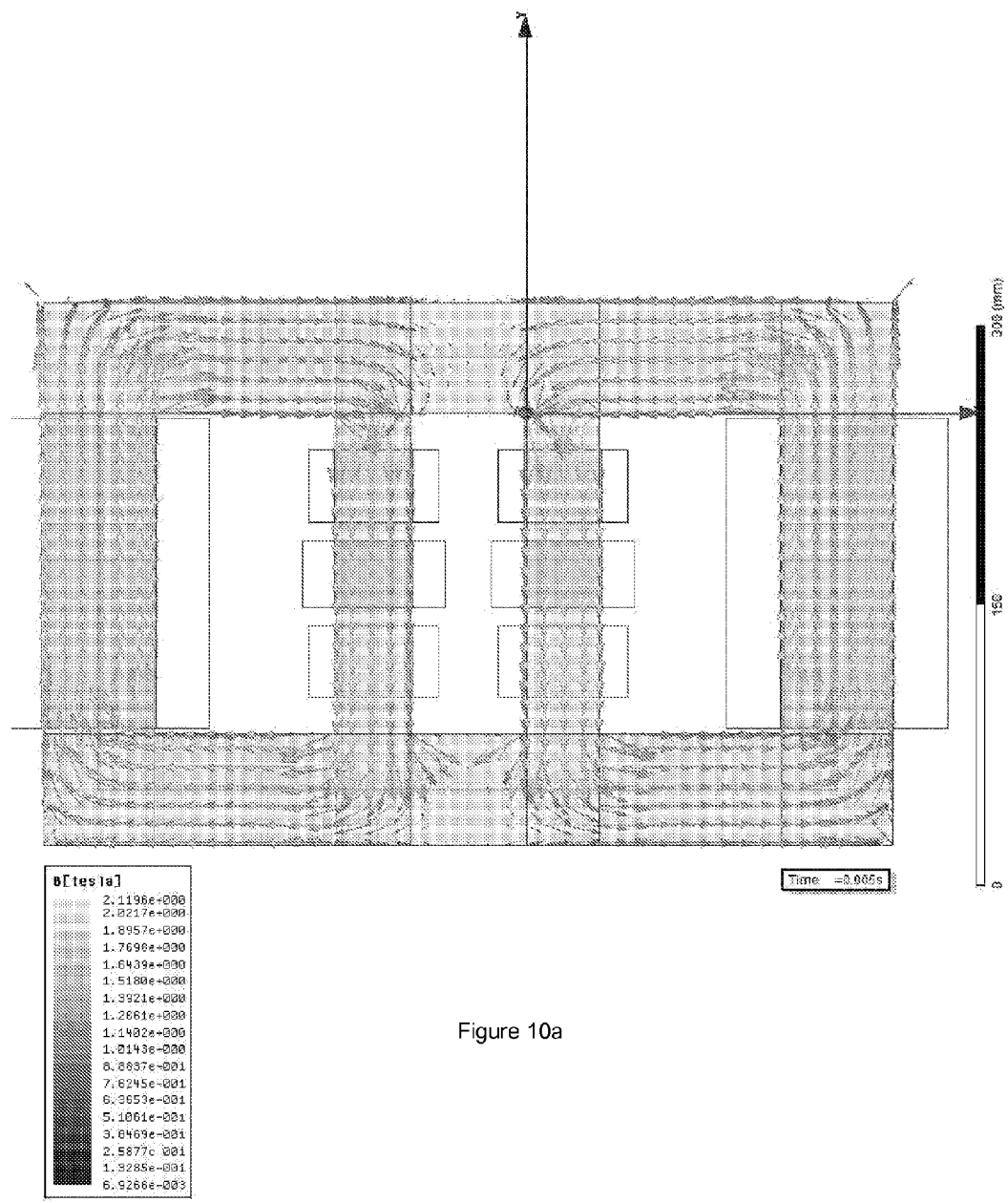
FIG. 10a shows a model of flux density (B) and FIG. 10b shows a model of AmpTurns/m (H) for normal operating conditions of the second embodiment of the invention.
Figure 10B:
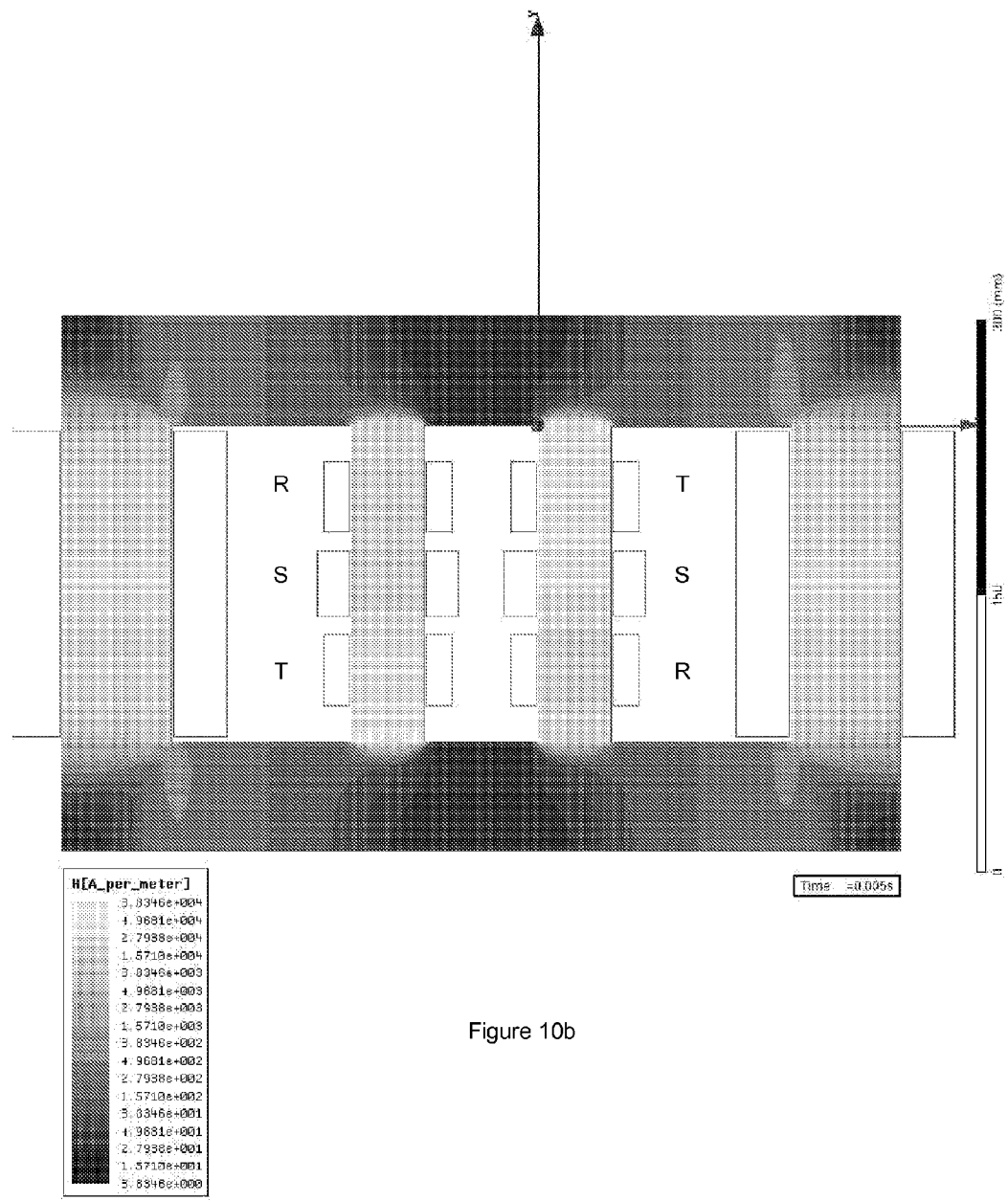

FIGS. 10a and 10b show a snapshot in time in the normal current state (t=5 milliseconds). At t=5 milliseconds, the R phase of the three phase AC current is at peak, and the S and T phases are in the opposite half-cycle.

Hence, the first and second AC coils 121Ra, 121Rb will act to produce an AC flux circuit in one direction, whereas the other two sets of AC coils (121Ta/121Tb, 121Sa/121Sb) for the other two phases will act to produce AC magnetic circuits in the other direction (but with smaller magnitude). In a similar way to as described in relation to FIG. 5b, the arrangement of the AC magnetic circuits for each phase supporting/opposing the DC magnetic circuits will reverse with each half-cycle.

As a result, in normal conditions and as shown in FIG. 10b, there are regions in the two inner legs (second and third legs 120a and 120b) that are put deeper in saturation, and regions that are put into less saturation. The regions of deeper/less saturation depend on the magnitude of the currents in each of the three sets of AC coils, which varies with time.

As shown in FIG. 10b, the effect of this is to keep both the inner legs in the saturated state, so that the impedance of the inner legs is very low, so that the FCL 100 is transparent to the grid.

Figure 11A:
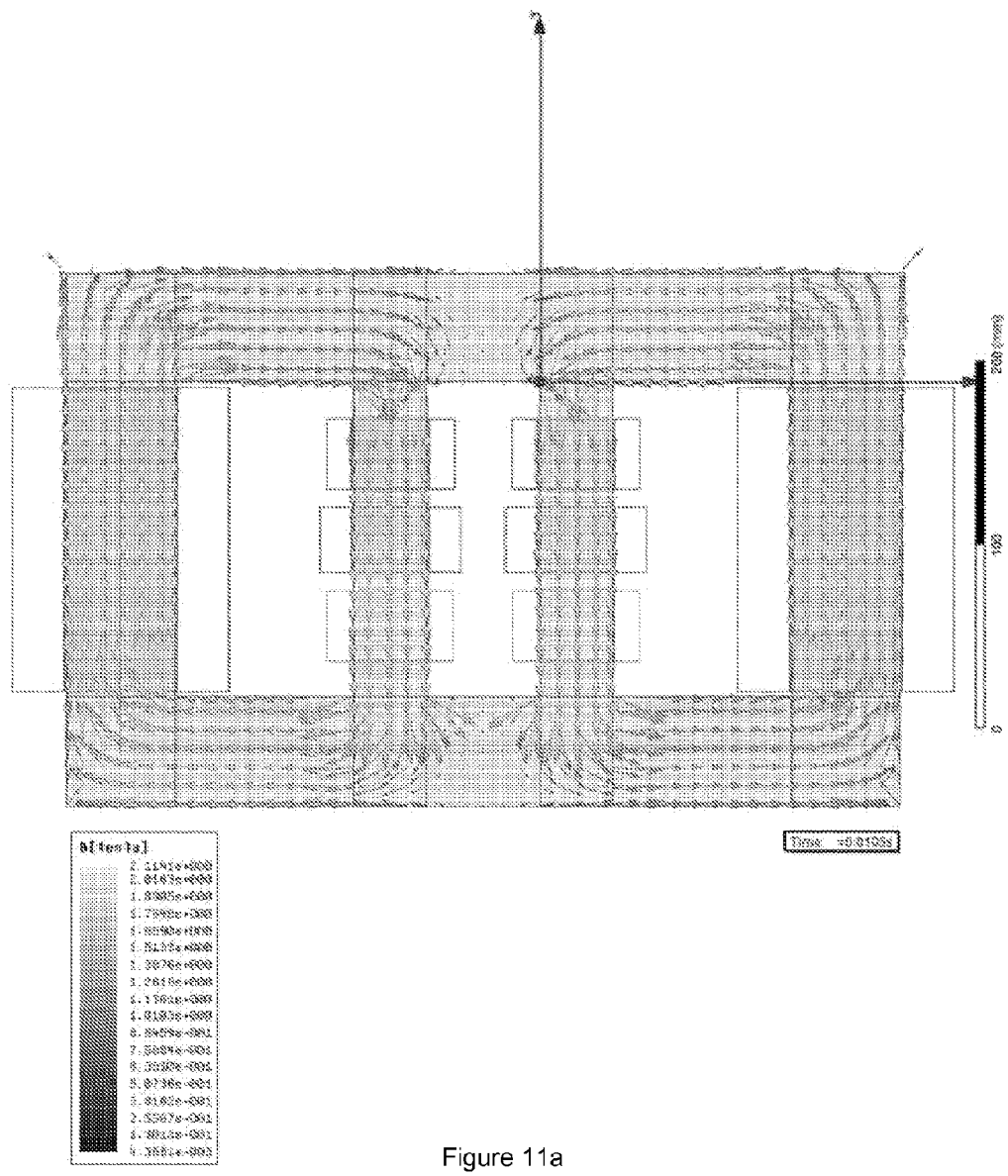
FIG. 11a shows a model of flux density (B) and FIG. 11b shows a model of AmpTurns/m (H) at the start of a fault condition of the second embodiment of the invention.
Figure 11B:
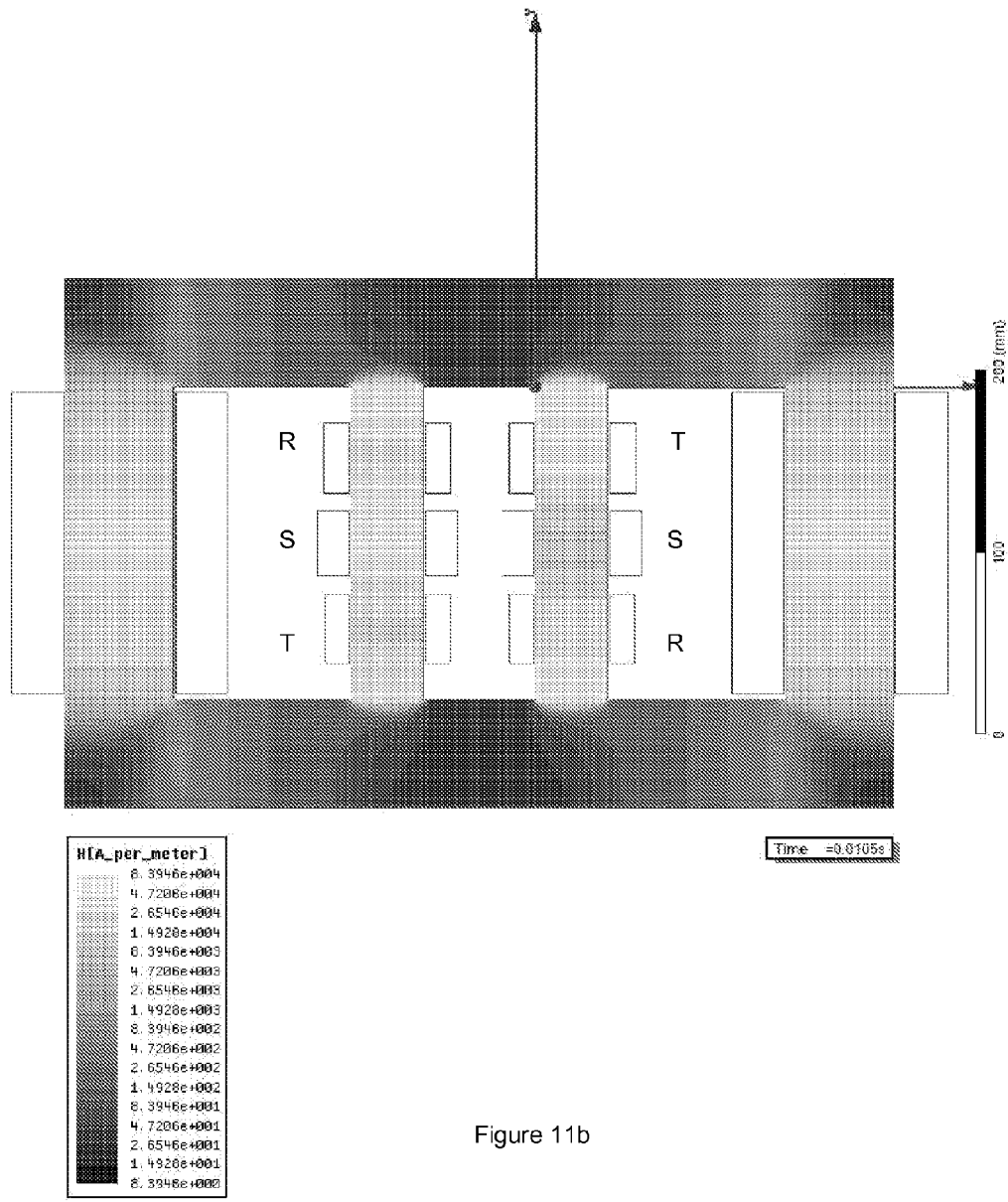

As shown in FIG. 8, at a time of 10.5 milliseconds, a short circuit state is simulated. FIGS. 11a and 11b show flux and saturation plots at the start of the short circuit state. As will be appreciated, the effect of the short circuit state in a three-phase fault is that each of the AC currents in the three sets of AC coils will increase. Hence, the opposing/supporting effect described above will be magnified, and there will be regions of each leg that are deeper in saturation and regions that are unsaturated in each leg. The pattern of saturation/desaturation will change with time as the AC currents in each of the phase coils change.

Figure 12A:
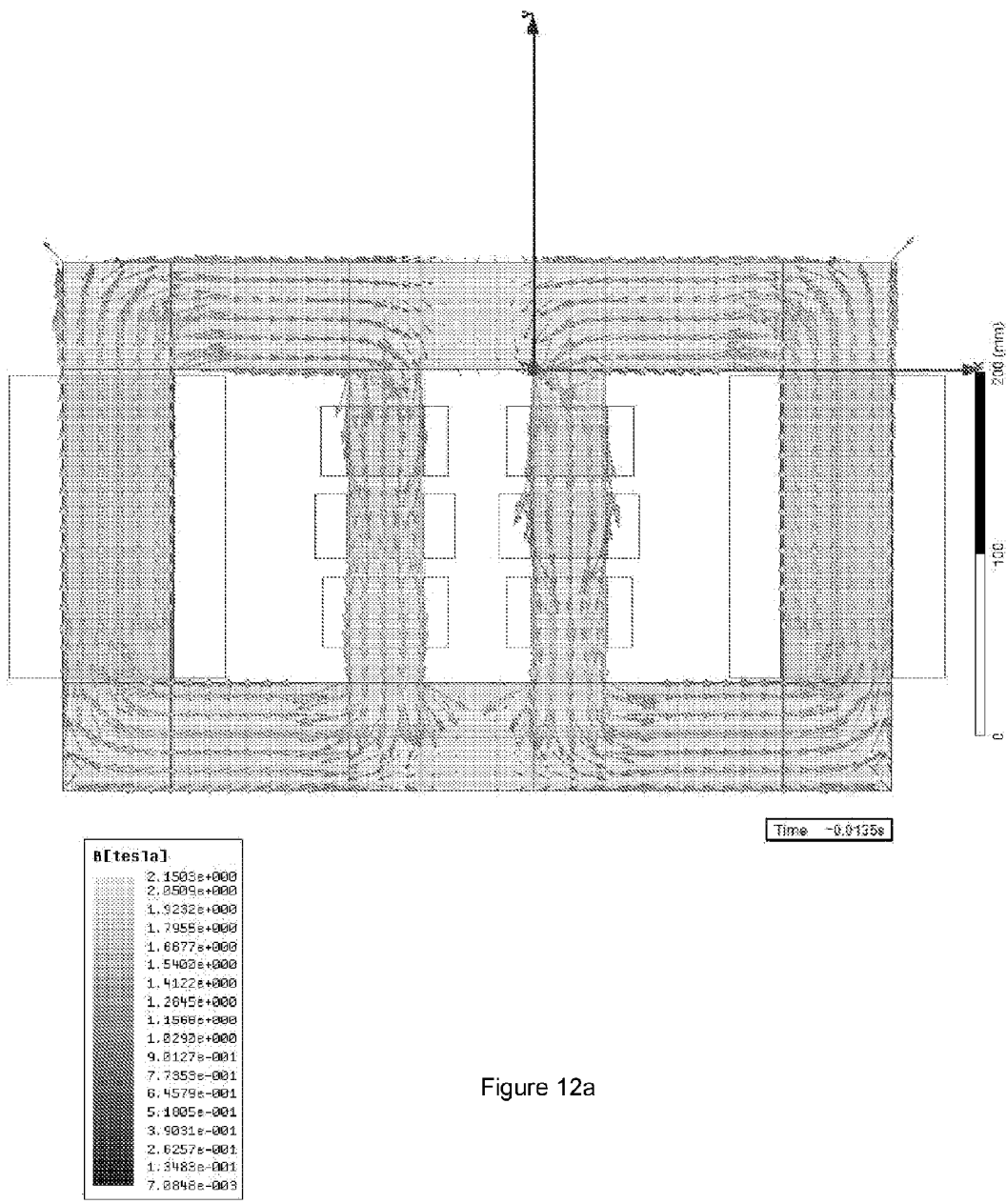
Figure 12B:
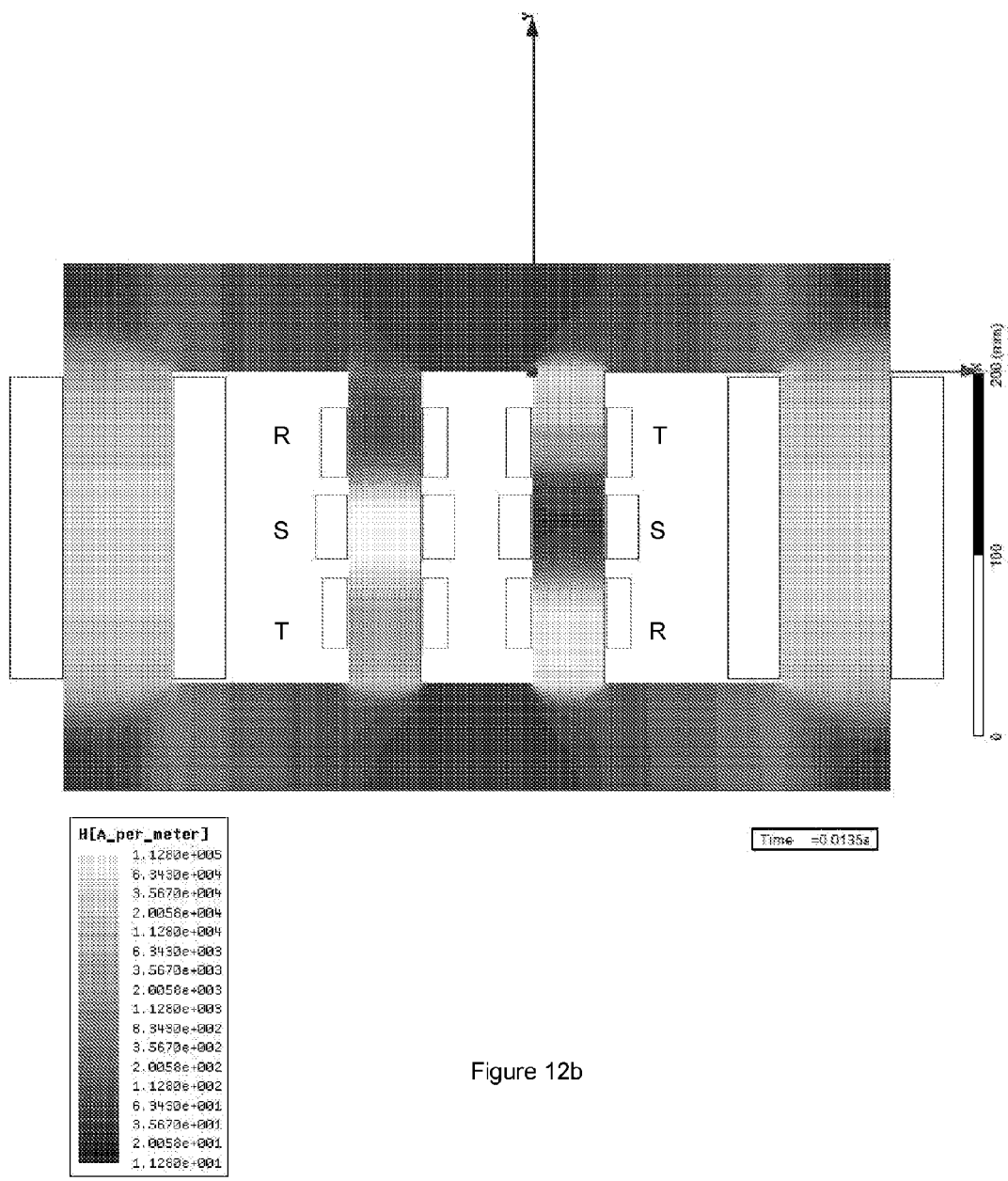

FIGS. 12a and 12b show flux density (B) and Amp-Turns/m (H) plots at a time of 10.5 milliseconds, which represents the first peak after the short circuit, this being for the second (S) AC phase.

Comparing FIG. 12b (t=5 milliseconds) to the start of the short circuit in FIG. 11b (t=10.5 milliseconds), it can be seen that the rising AC current on the third and fourth AC coils 121Sa and 121Sb causes one portion of the second leg 120a to be put deeper into saturation (lighter in colour) and a portion of the third leg 120b to be put out of saturation (darker in colour). This can be explained by considering the effect of the three AC magnetic circuits produced by the three sets of AC coils, with each opposing the DC flux in one inner leg and supporting the DC in the other inner leg.

Figure 13A:
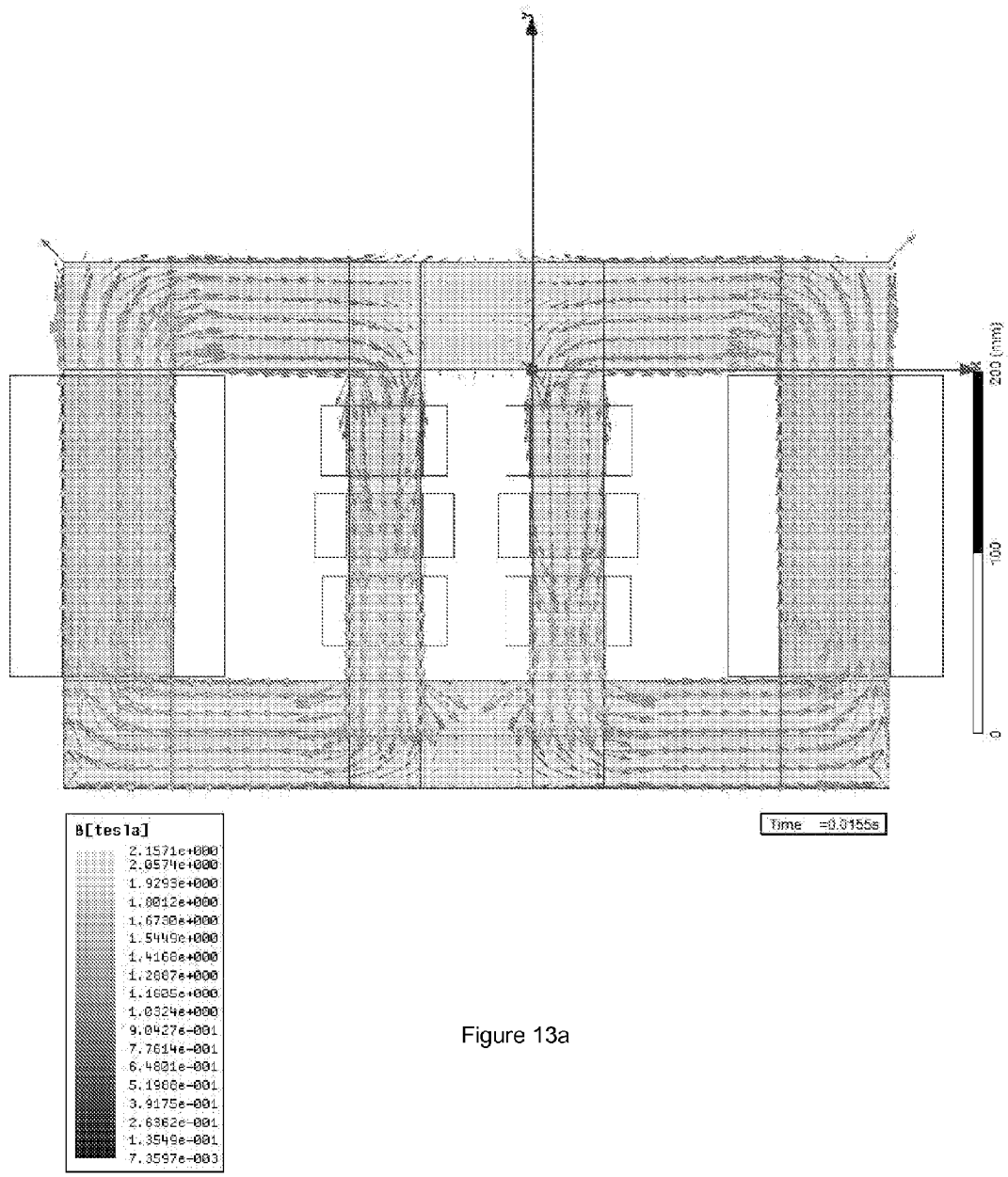
Figure 13B:
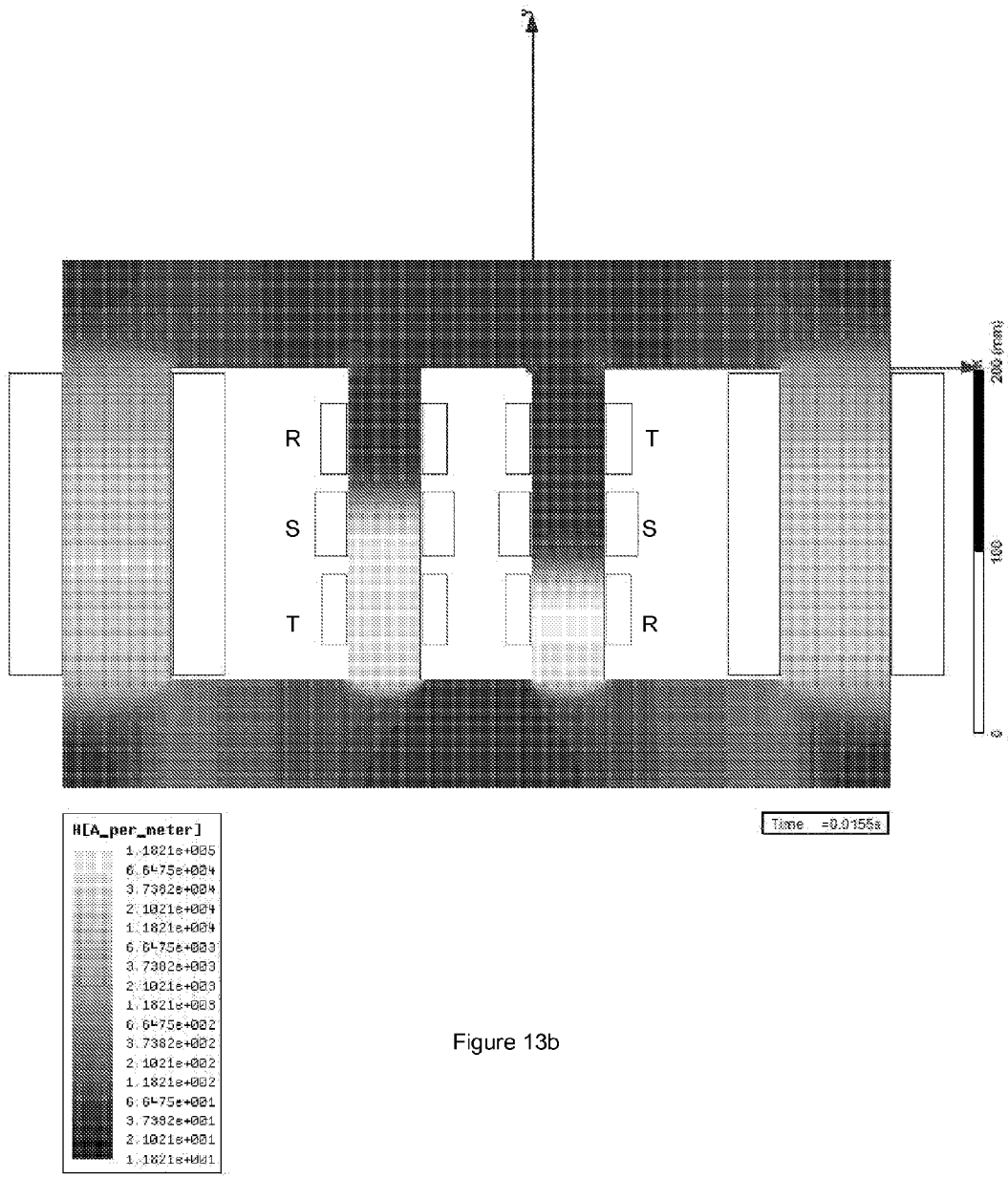

FIGS. 13a and 13b show flux density (B) and Amp-Turns/m (H) plots at a time of 15.5 milliseconds, which represents the second peak after the short circuit, this being for the first (R) AC phase. Compared to FIG. 12b, it can be seen that the pattern of deeper/less saturation has changed in FIG. 13b, due to the rising current on the first and second AC coils 121Ra, 121Rb, and the corresponding changes on the other AC coils for the other phases.

Figure 14A:
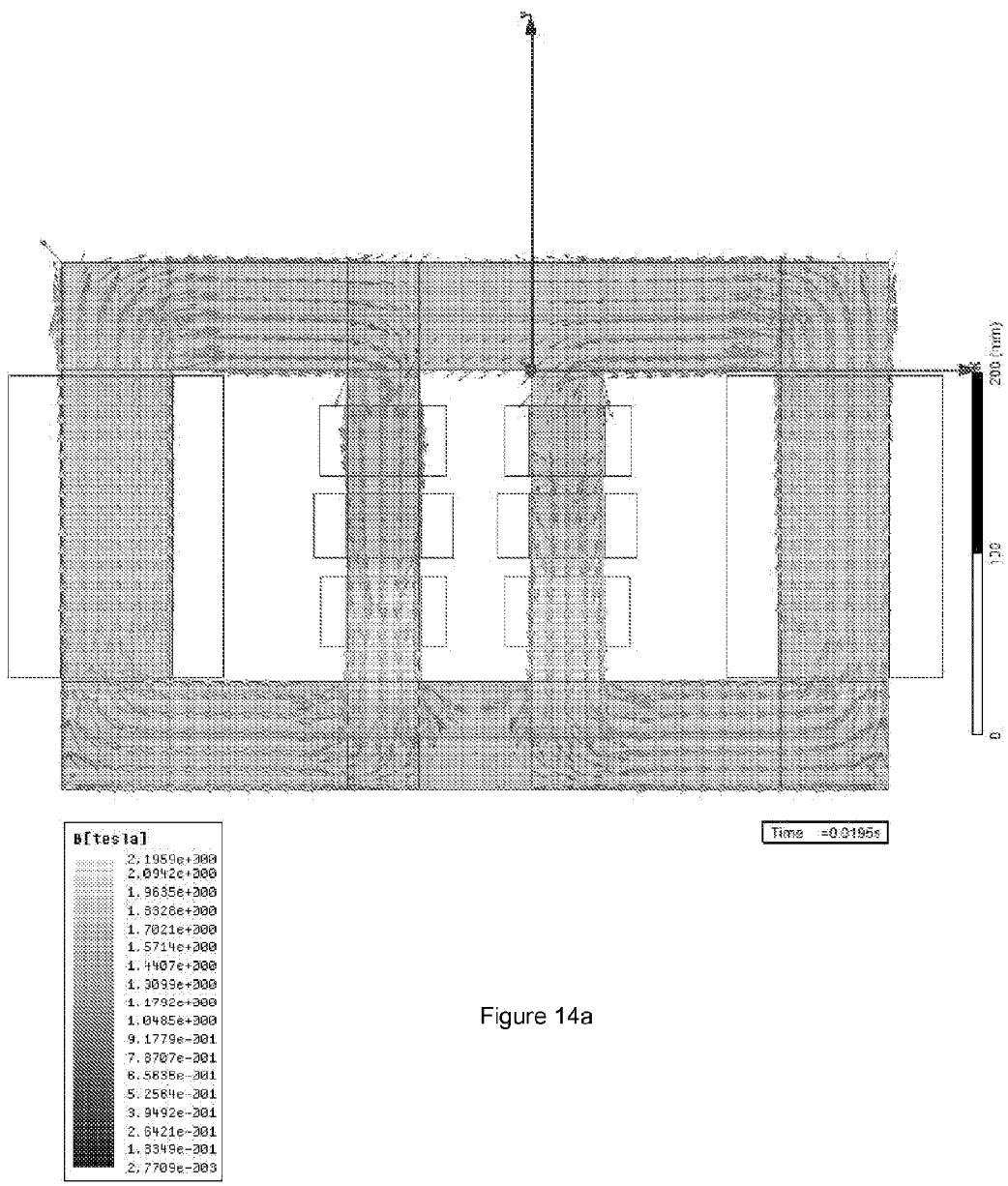
Figure 14B:
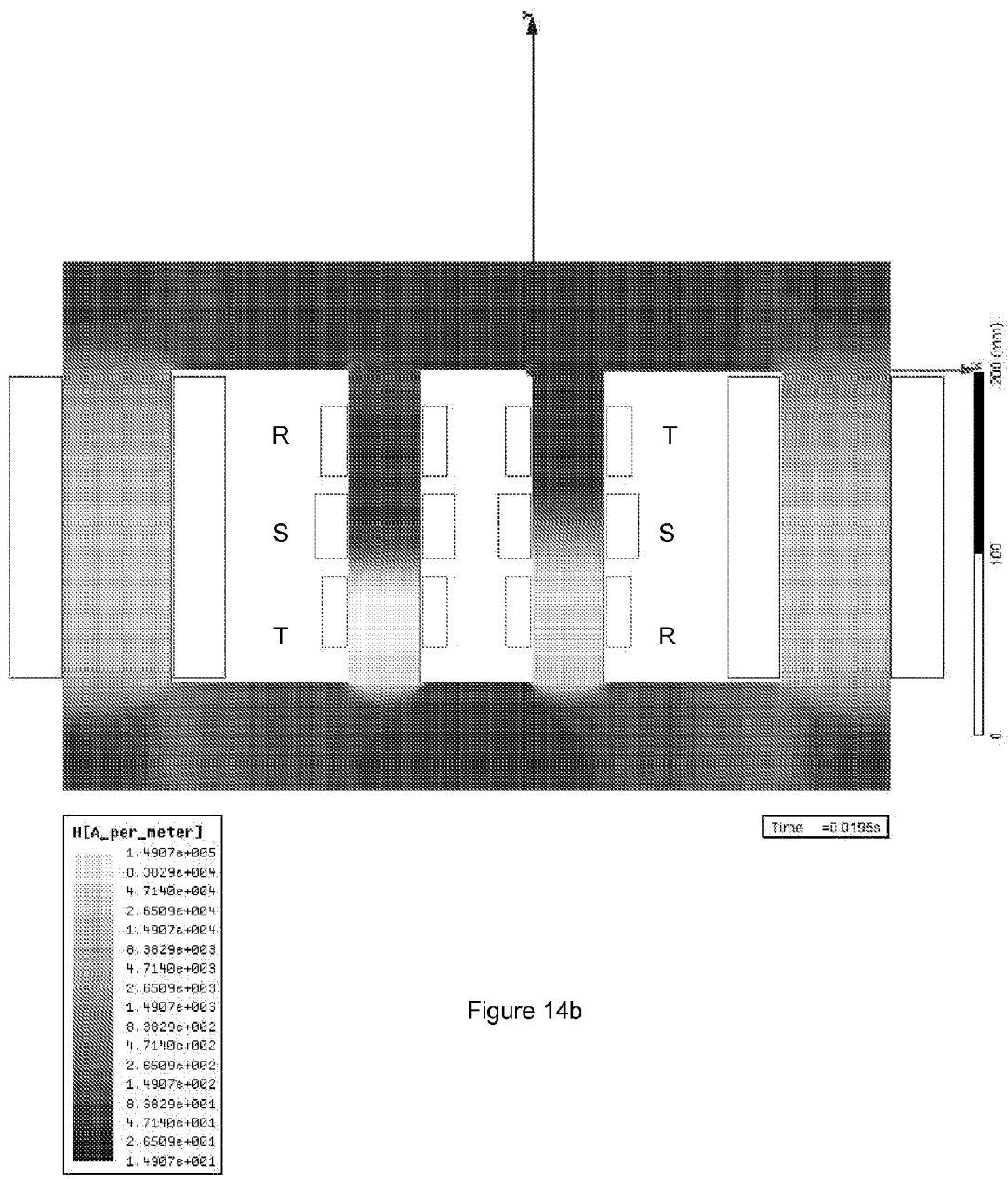

FIGS. 14a and 14b show flux density (B) and Amp-Turns/m (H) plots at a time of 19.5 milliseconds, which represents the third peak after the short circuit, this being for the third (T) AC phase. Compared to FIG. 13b, it can be seen that the pattern of areas of deeper/less saturation in the two inner legs has changed again, this time caused by the peak for the T phase, causing the current on the fifth and sixth AC coils 121Ta and 121B to rise.

Figure 15A:
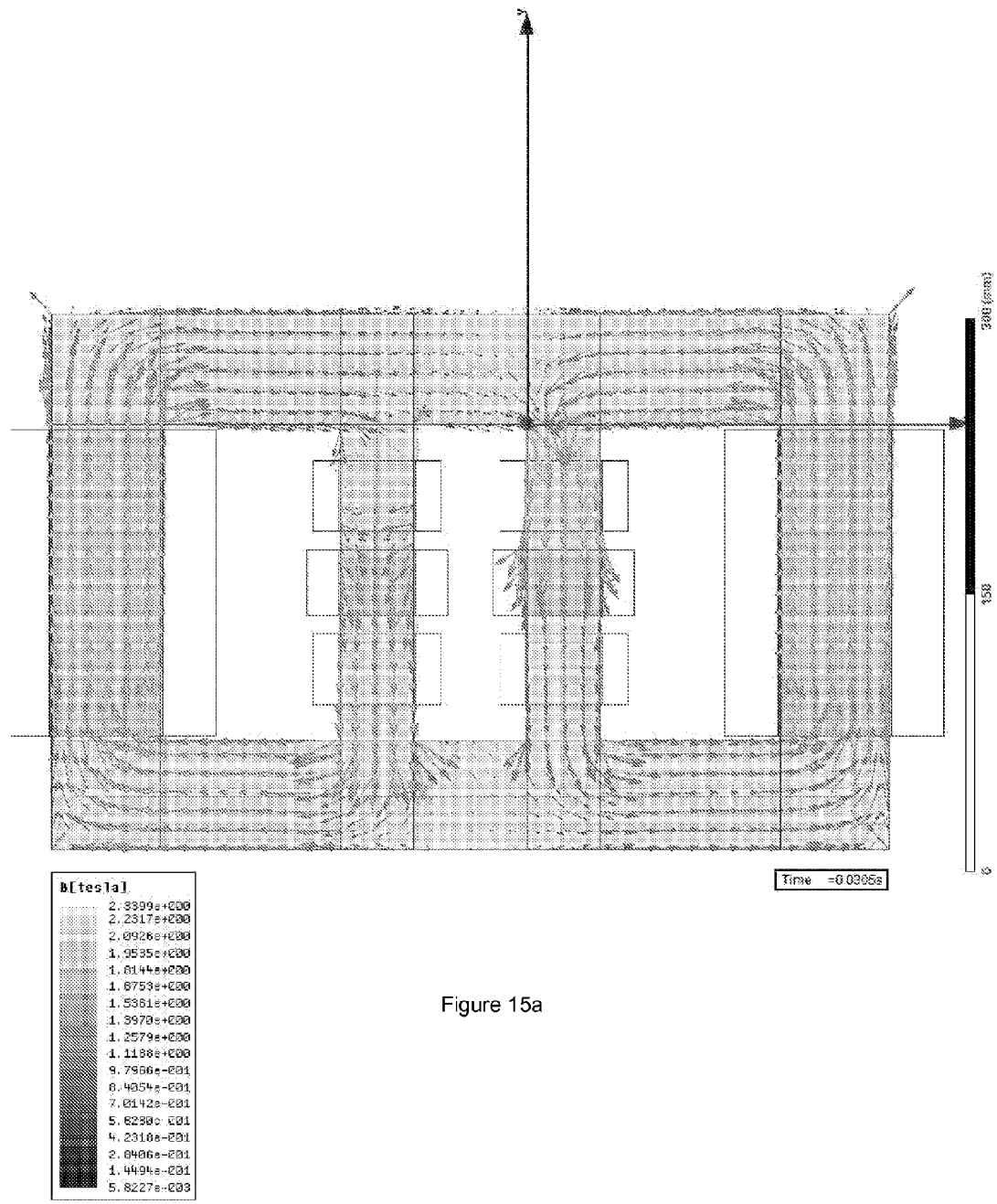
Figure 15B:
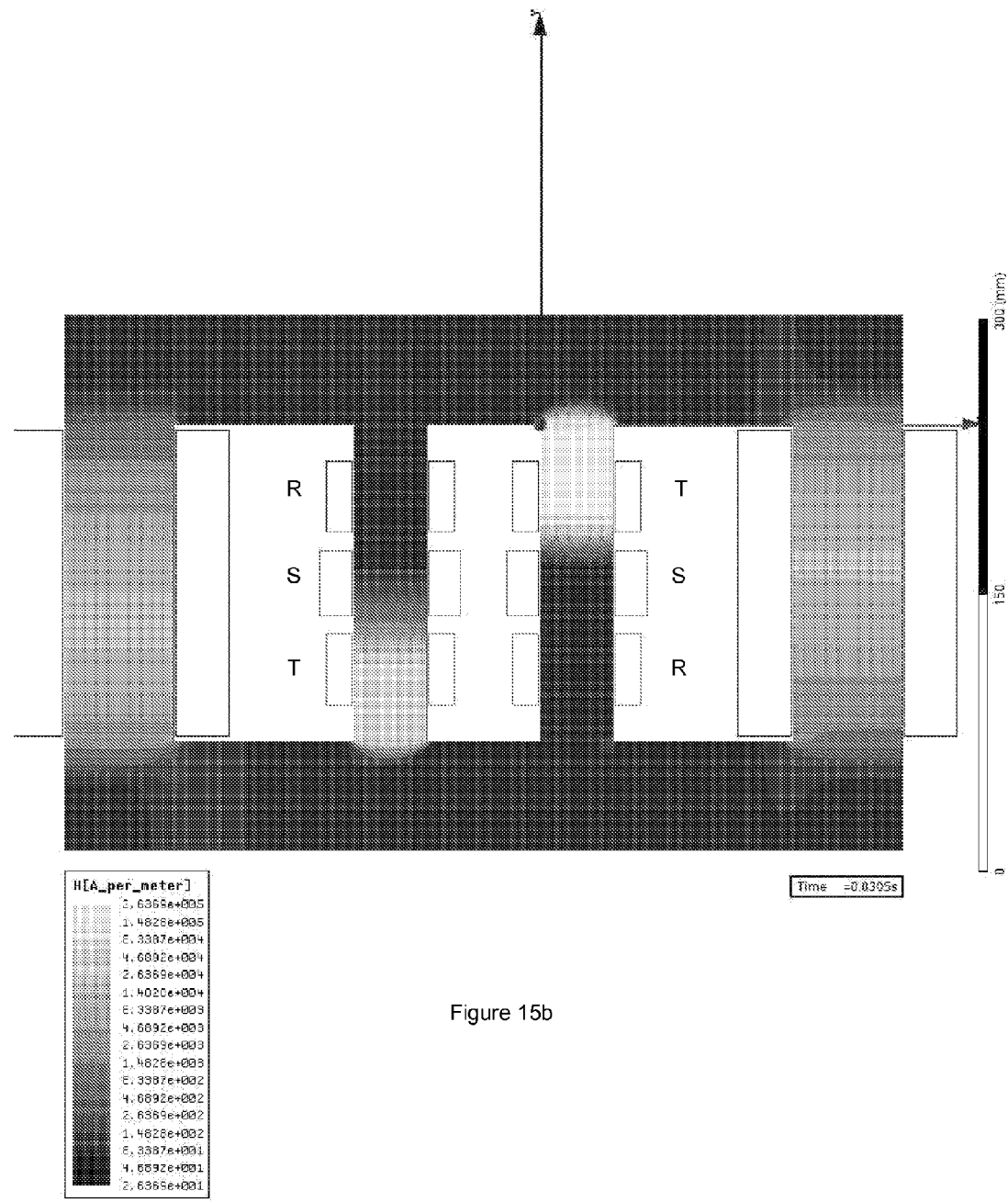

FIGS. 15a and 15b show flux density (B) and Amp-Turns/m (H) plots at a time of 30.5 milliseconds, which represents the next peak for the third (T) AC phase after that shown in FIGS. 14a and 14b. As a result, FIGS. 15a and 15b show flux and saturation plots in the opposite half cycle to FIGS. 14a and 14b. As can be seen, the pattern of areas of deeper/less saturation in the two inner legs in FIG. 15b is reversed when compared to FIG. 14a.

FIGS. 8-15 relate to a three-phase fault, but that the operation of FCL 100 will equally act to limit faults in one or two phase faults. In the case of a one or two phase fault, any rising of the current in one of the sets of AC phase coils will have the effect of putting an area of one inner leg into deeper saturation, and an area of the other inner leg out of saturation. Hence, the arrangement shown in FIG. 7 can limit a wide range of fault conditions.

The FCL 100 of the second embodiment can further comprise a tank (not shown) arranged to house the core. The tank can be partially or completely filled with a dielectric fluid. Any suitable dielectric fluid could be used, for example mineral oil.

In the FCL 100 of the second embodiment, the first 121Ra, third 121Sa and fifth 121Ta AC coils are arranged from top to bottom in order on the second leg 120a, and the sixth 121Tb, fourth 121Sb and second 121Rb AC coils are arranged top to bottom in order on the third 120b leg. However, in other embodiments, the R, S, T coils on each leg may be arranged in a different pattern. For example, in some embodiments, the first 121Ra, third 121Sa and fifth 121Ta AC coils may be arranged in order on the second leg 120a, and the sixth 121Tb, fourth 121Sb and second 121Rb AC coils may be arranged in the same order on the third 120b leg.

In some embodiments that use three AC coils (one of each phase) on a single core, the AC coils for each phase can be configured so that at least one of the AC coils for each phase exhibits unbalanced magnetic impedance relative to remaining ones of the AC coils for each phase (in this context, the terms "asymmetry" and "unbalanced" are equivalent).

In other words, in each triplet, two the AC coils may have the same magnetic impedance while the third is different or alternatively all three coils in each triplet may have different magnetic impedances. It should also be noted that the imbalance may be due to different self-impedances of the three AC coils or to different mutual impedances thereof. In some embodiments, the AC coils of each phase can be wound with different numbers of turns so as to achieve asymmetrical magnetic impedance. In other embodiments, the AC coils of each phase can disposed on different portions of the inner legs so as to achieve asymmetrical magnetic impedance. Furthermore, the AC coils of each phase can have different coil geometries so as to achieve asymmetrical magnetic impedance.

The FCL described in relation to the second embodiment is associated with the same advantages as those associated with the first embodiment. It has the advantage that it provides protection for three phases in a compact design on a single core.

In embodiments in which there is one core for one phase, there in no inter-phase coupling for the AC flux, which further increases the fault to normal state impedance ratio compared to conventional arrangements. Embodiments that use three phase AC coils on a single core may offer lower impedance ratios than using one core per phase, due to coupling from the phases on the single core. Hence, such embodiments may be adopted where lower impedance ratio is specified. However, using three phase AC coils on a single core offers a more compact design.

As for the first embodiment, the second embodiment employs a first DC coil wound on the first leg to provide a first magnetic biasing unit that produces a first closed magnetic circuit in the first leg, and a second DC coil wound on the fourth leg to provide a second magnetic biasing unit that produces a second closed magnetic circuit in the fourth leg and the third leg that has a flux direction opposite to the flux direction of the first closed magnetic circuit. However, the first and/or second magnetic biasing unit could comprise any other suitable magnetic source, for example a permanent magnet forming all or part of the respective leg.

FIGS. 16a and 16b show a further embodiment of the invention in which three four legged cores 201, 202, 203 (for example of the type shown in FIG. 1) are arranged in a common tank 205 to provide a three phase FCL. FIG. 16a shows an end elevation view, whereas FIG. 16b shows a front elevation.

FIGS. 16a and 16b show three four legged cores of the type shown in FIG. 1 arranged in a vertically stacked arrangement in a common tank 205, with the AC coils of each four legged core 201, 202, 203, connected to one of the three AC phases R, S, T. The tank 205 can be partially or completely filled with a dielectric fluid.

Figure 17A:
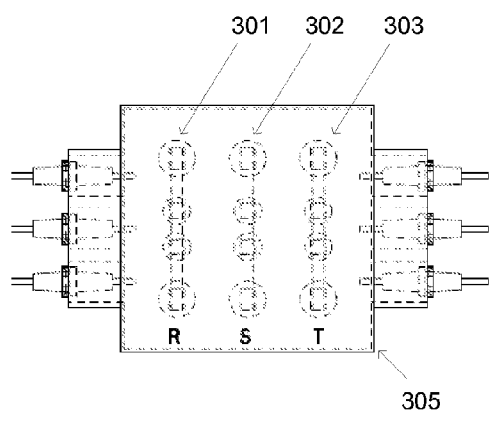
FIGS. 17a and 17b show cross-sections of an FCL according to a fourth embodiment of the invention.
Figure 17B:
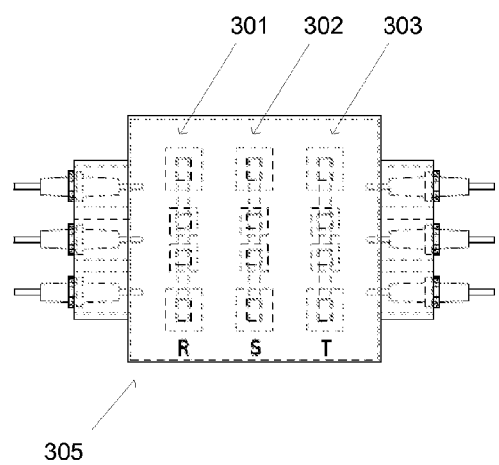

FIGS. 17a and 17b show variants of FIGS. 16a and 16b, in which three cores 301, 302, 303 (each with four legs) are arranged in a horizontal stack in a common tank 305, with the AC coils of each four legged core, 302, 303 connected to one of the three AC phases R, S, T. The tank 305 can be partially or completely filled with a dielectric fluid. FIG. 17a shows an arrangement with round coils, and FIG. 17b shows an arrangement with square coils. Other embodiments (and this applies to all embodiments of the invention) could use other cross-sections.

Figure 18:
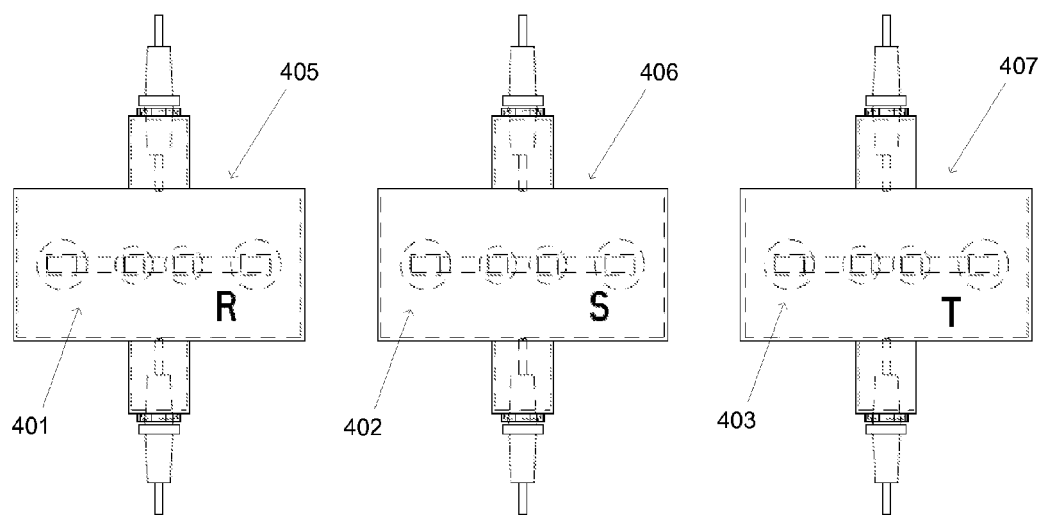
FIG. 18 shows a cross-section of an FCL according to a fifth embodiment of the invention.

FIG. 18 shows another embodiment of a three-phase FCL in which there is a bank of three individual cores 401, 402, 403 (each with four legs) arranged in separate tanks 405, 406, 407, each core for one of the three AC phases R, S, T. In other words, FIG. 18 shows how three FCLs of the type shown in FIG. 1 (or otherwise) could be arranged in separate tanks so as to provide a fault current limiter for a three phrase A supply.

Figure 19:
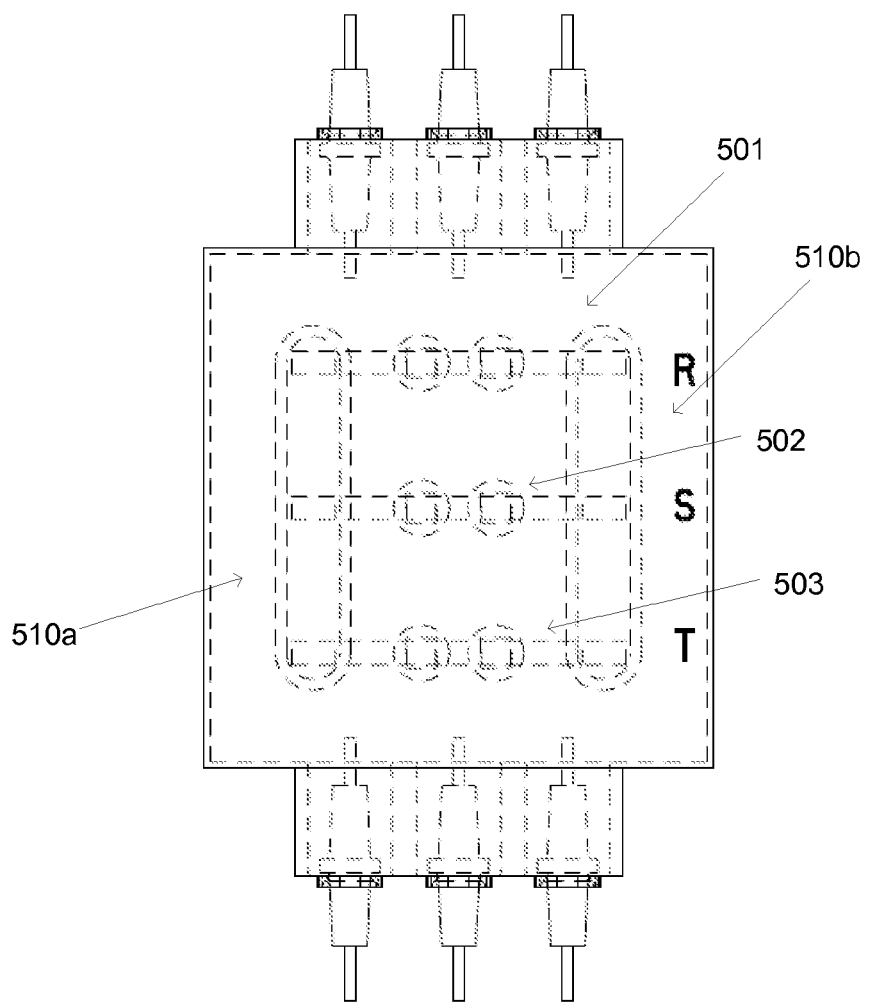
FIG. 19 shows a cross-section of an FCL according to a sixth embodiment of the invention.

FIG. 19 shows a further embodiment in which three cores 501, 502, 503, each with four legs, are arranged side-by-side, with each of the cores 501, 502, 503 sharing two common DC coils 510s, 510b.

Each core (first 501, second 502 and third 503) has two outer legs (first and fourth legs) and two inner legs (second and third legs) in a similar way to those cores discussed above. Each core 501, 502, 503 has an AC coil wound around each of its two inner legs (second and third legs), with each set of AC coils being would in series and connected to one phase of the three-phase supply. The outer legs (first and fourth legs) of each of the three cores share a common DC coil 510a, 510b.

As can be seen from FIG. 19, a first common DC coil 510a is wound around the first legs so as to provide a first DC coil for the first, second and third cores 501, 502, 503.

Furthermore, a second common DC coil 510*b* is wound around the second legs so as to provide a second DC coil of the first, second and third cores 501, 502, 503.

Hence, in the arrangement of FIG. 19, the first and second common DC coils 510*a*, 510*b* provide DC magnetic circuits in the inner legs (second and third legs) of the three cores. Hence, the operation of each core 501, 502, 503 (for each phase) is similar to that described in relation to FIG. 1, with the DC flux being provided by the first and second common DC coils.

In addition to the above mentioned embodiments, embodiments of the invention can have different arrangements. For example, in the first embodiment, there is one set of series connected AC coils for a single AC phase FCL, and the second embodiment employs three sets of series connected AC coils for a three AC phase FCL. However, it will be appreciated that other embodiments of the invention may have n sets of series connected AC coils, each set of series connected AC coils being for one of n AC phases. For example, the core may have two sets of AC coils, one for each of two phases.

In embodiments of the invention, the AC winding conductor may be any suitable material, such as aluminium or copper. Furthermore, the AC DC winding conductor can be any suitable material, for example aluminium, copper or a high temperature superconductor.

Some embodiments employ fluid around the windings, such as mineral oil, vegetable oil or cryogenic fluid.

Some embodiments, for example for small FCLs, may employ dry type solid insulation and air around the windings with a tank/enclosure.

The AC and DC windings can have various shapes, such as circular, rectangular, oval or race-track shapes. Furthermore, the core legs and yokes can have circular (cruciform), oval or rectangular cross-section. The AC and DC coils can be wound on circular, oval or rectangular formers.

All previously described embodiments of the invention employ cores with four legs that are orientated in the same direction (e.g. vertically). However, it will be appreciated that the present invention is not limited to this, and alternative arrangements of the four legs are possible. For example, the four legs could be arranged in other ways that achieves a first closed DC magnetic circuit in the first leg and the second leg that has a first DC flux direction, and a second closed DC magnetic circuit with a DC flux direction opposite to the first closed DC magnetic circuit, with a first closed AC magnetic circuit in the second and third legs in an AC flux direction that alternates with each AC half-cycle. For example, the legs could be sloped.

In the above described embodiments, the AC legs (i.e. the inner two legs) have a lower cross-section than the DC legs (i.e. the two outer legs) and the yokes. However, in other embodiments, the portion of the yokes between the two AC legs may be of lower or higher cross-section than the remainder of the yokes.

In the above described embodiments of the invention, there are one or more cores that each has four legs. The four legs are shown in the figures as being arranged in the same plane. However, embodiments of the invention are not limited to this. While arranging the four legs in a row in the same plane makes manufacturing easier (as all the legs are easily accessible), it will be appreciated that the four legs could be arranged in alternate ways while maintaining the same arrangement of the DC and AC closed magnetic circuits. For example, the four legs could be in a staggered arrangement or other shape.

Many further variations and modifications will suggest themselves to those versed in the art upon making reference to the foregoing illustrative embodiments, which are given by way of example only, and which are not intended to limit the scope of the invention, that being determined by the appended claims.

The invention claimed is:

1. A fault current limiter comprising a first magnetically saturable core, the first core including:
   a first leg;
   a second leg, with a first AC coil wound on the second leg;
   a third leg, with a second AC coil wound around the third leg, the first and second AC coils being wound in series and connected to a first phase AC source;
   a fourth leg;
   wherein the first, second, third and fourth legs are arranged in order, wherein first ends of the first, second, third and fourth legs are joined by a first yoke and second ends of the first, second, third and fourth legs are joined by a second yoke;
   a first magnetic biasing unit arranged to produce a first closed magnetic circuit in the first leg and the second leg that has a first flux direction; and
   a second magnetic biasing unit arranged to produce a second closed magnetic circuit in the fourth leg and the third leg that has a second flux direction, wherein the first flux direction opposes the second flux direction;
   wherein the first and second AC coils are arranged to produce a first closed AC magnetic circuit in the second and third legs in an AC flux direction that alternates with each AC half-cycle.

2. A fault current limiter according to claim 1, wherein the first, second, third and fourth legs are orientated in the same direction.

3. A fault current limiter according to claim 2, wherein the first, second, third and fourth legs are arranged vertically.

4. A fault current limiter according to any preceding claim, wherein the first and second yokes are orientated in the same direction.

5. A fault current limiter according to claim 4, wherein the first and second yokes are arranged horizontally.

6. A fault current limiter according to claim 1, wherein the first magnetic biasing unit comprises a first DC coil wound on the first leg, and the second magnetic biasing unit comprises a second DC coil wound on the fourth leg.

7. A fault current limiter according to claim 1, wherein the FCL further comprises a third AC coil wound around the second leg and a fourth AC coil wound around the third leg, the third and fourth AC coils being wound in series and connected to a second phase AC source, wherein the third and fourth AC coils are arranged to produce a second closed AC magnetic circuit in the second and third legs in an AC flux direction that alternates with each AC half-cycle.

8. A fault current limiter according to claim 7, wherein the FCL further comprises a fifth AC coil wound around the second leg and a sixth AC coil wound around the third leg, the fifth and sixth AC coils being wound in series and connected to a third phase AC source, wherein the fifth and sixth AC coils are arranged to produce a third closed AC magnetic circuit in the second and third legs in an AC flux direction that alternates with each AC half-cycle.

9. A fault current limiter according to claim 8, wherein the first, third and fifth AC coils are arranged in order on the second leg, and the second, fourth and sixth AC coils are arranged in the opposite order on the third leg.

10. A fault current limiter according to claim 8 or 9, wherein the AC coils for each phase AC source are configured in pairs such that at least one of the pairs of AC coils exhibits unbalanced magnetic impedance relative to remaining ones of the pairs AC coils for each phase.

11. A fault current limiter according to claim 1, wherein the second and third legs have a smaller cross section than the first and fourth legs.

12. A fault current limiter according to claim 1, further comprising a tank arranged to house the first core, the tank being partially or completely filled with a dielectric fluid.

13. A fault current limiter according to claim 1, further comprising a second magnetically saturable core, and a third magnetically saturable core, the second and third cores respectively including:
   a first leg;
   a second leg, with a first AC coil wound on the second leg;
   a third leg, with a second AC coil wound around the third leg, the first and second AC coils being wound in series;
   a fourth leg;
   wherein the first, second, third and fourth legs are arranged in order, wherein first ends of the first, second, third and fourth legs are joined by a first yoke and second ends of the first, second, third and fourth legs are joined by a second yoke;
   a first magnetic biasing unit arranged to produce a first closed magnetic circuit in the first leg and the second leg that has a first flux direction; and
   a second magnetic biasing unit arranged to produce a second closed magnetic circuit in the fourth leg and the third leg that has a second flux direction, wherein the first flux direction opposes the second flux direction;
   wherein the first and second AC coils are arranged to produce a first closed AC magnetic circuit in the second and third legs in an AC flux direction that alternates with each AC half-cycle;
   wherein the first and second AC coils of the second core are connected to a second phase AC source, and the first and second AC coils of the third core are connected to a third phase AC source.

14. A fault current limiter according to claim 13, wherein the second and third legs of the second and third cores have a smaller cross section than the first and fourth legs of the second and third cores.

15. A fault current limiter according to claim 13 or 14, wherein the first, second and third cores are arranged in a same tank, said tank being partially or fully filled with a dielectric fluid.

16. A fault current limiter according to claim 13, wherein the first magnetic biasing unit of the second and third cores respectively comprises a first DC coil wound on the respective first leg, and the second magnetic biasing unit of the second and third cores respectively comprises a second DC coil wound on the respectively fourth leg.

17. A fault current limiter according to claim 13, wherein a first common DC coil is wound around the first, second and third cores to provide the first magnetic biasing units of the first, second and third cores, and a second common DC coil is wound around the second legs of the first, second and third cores so as to provide the second magnetic biasing unit of the first, second and third cores.

18. A fault current limiter according to claim 13, wherein the first, second and third cores are separate.

19. A fault current limiter according to claim 18, wherein the first, second and third cores are arranged in vertically or horizontally in said same tank.

20. A fault current limiter according to claim 18, wherein the first, second and third cores are arranged in separate tanks, each tank being partially or fully filled with a dielectric fluid.

* * * * *